(12) United States Patent
Komiya et al.

(10) Patent No.: US 6,822,415 B1
(45) Date of Patent: Nov. 23, 2004

(54) MOTOR CONTROLLER

(75) Inventors: Takehiko Komiya, Fukuoka (JP); Kozo Ide, Fukuoka (JP); Ryuichi Oguro, Fukuoka (JP); Keisei Inoki, Fukuoka (JP); Tetsuro Izumi, Fukuoka (JP); Kazuhiro Tsuruta, Fukuoka (JP); Nobuhiro Umeda, Fukuoka (JP); Soki Kaku, Fukouka (JP)

(73) Assignee: Kabushiki Kaish Yaskawa Denki, Fukuoka (JP)

( * ) Notice: Subject to any disclaimer, the term of this patent is extended or adjusted under 35 U.S.C. 154(b) by 88 days.

(21) Appl. No.: 10/258,311
(22) PCT Filed: Apr. 20, 2001
(86) PCT No.: PCT/JP01/03354
§ 371 (c)(1),
(2), (4) Date: Oct. 18, 2002
(87) PCT Pub. No.: WO01/82462
PCT Pub. Date: Nov. 1, 2001

(30) Foreign Application Priority Data
Apr. 20, 2000 (JP) .................................... 2000-119379

(51) Int. Cl.$^7$ .............................................. G05B 11/01
(52) U.S. Cl. .................... 318/629; 318/632; 318/638; 318/560; 318/603; 318/609; 318/610
(58) Field of Search ................................. 318/602, 603, 318/609, 610, 629, 632, 638, 560

(56) References Cited
U.S. PATENT DOCUMENTS

| | | | | |
|---|---|---|---|---|
| 4,980,617 A | * | 12/1990 | Tajima et al. | ............... 318/254 |
| 5,256,952 A | * | 10/1993 | Yoneyama et al. | .......... 318/629 |
| 5,637,969 A | * | 6/1997 | Kato et al. | .................... 318/432 |
| 6,469,467 B1 | * | 10/2002 | Fujita | .......................... 62/228.4 |
| 6,507,165 B2 | * | 1/2003 | Kato et al. | .................... 318/611 |

* cited by examiner

Primary Examiner—Rina Duda
(74) Attorney, Agent, or Firm—Knobbe Martens Olson & Bear, LLP

(57) ABSTRACT

A electric motor control device is provided for controlling an electric motor which actuates a movable member of a machine through a transmitting mechanism. When a torque command is given as motion command signal (9) to servo device (3), servo device (3) sends input torque signal (12) corresponding to motion command signal (9) to electric motor (5), which is energized. Movable member (7) is thus moved, producing vibrations. Servo device (3) outputs input torque signal (11) equivalent to input torque signal (12), and input torque signal (11) and rotational speed signal (10) are stored in memory device (2). Analyzing device (1) analyzes the frequencies of input torque signal (11) and rotational speed signal (10) according to an FFT, and outputs analytical result (14).

27 Claims, 29 Drawing Sheets

Prior Art

MOTOR CONTROLLER

This application is the U.S. National Phase under 35 U.S.C. §371 of International Application PCT/JP01/03354, filed Apr. 20, 2001, which claims priority to Japanese Patent Application No. 2000-119379, filed Apr. 20, 2000. The International Application was not published under PCT Article 21(2) in English.

TECHNICAL FIELD

The present invention relates to a method of and a device for controlling an electric motor to actuate, through a transmitting mechanism, a movable member of a machine which has the movable member and an immovable member for supporting the movable member.

BACKGROUND ART

FIG. 1 is a block diagram of a first conventional electric motor control device.

According to the first conventional electric motor control device, servo operation command 15 as an input item is determined without recognizing mechanical vibration characteristics of a machine which has a movable member 7 and an immovable member 8, and motion command signal 9 is sent to servo device 3, which sends motion command signal 9 as operation command 12 to electric motor 5, which causes transmitting mechanism 6 to move movable member 7. If the electric motor control device cannot sufficiently perform the servo function, then servo operation command 15 is changed on a trial-and-error basis.

The first conventional electric motor control device needs a very long period of time to determine an optimum servo operation command.

FIG. 2 is a block diagram of a second conventional electric motor control device.

According to the second conventional electric motor control device, analyzing device 31', input device 32, and output device 34 are added to the first conventional electric motor control device. Motion command signal 9 generated by analyzing device 31', is sent as an analog signal to servo device 3, which sends motion command signal 9 as operation command 12 to electric motor 5, which causes transmitting mechanism 6 to move movable member 7. Rotation detector 4 sends rotation detector signal 10 through servo device 3 to analyzing device 31'. Analyzing device 31' performs a fast Fourier transform on motion command signal 9 and rotation detector signal 10 to calculate frequency characteristics, determines analytical result 35, and determines servo operation command 15 based on analytical result 35.

According to the second conventional electric motor control device, as shown in FIG. 3, since motion command signal 9 generated by analyzing device 31' has frequency components up to maximum frequency component frmax in excess of maximum measured frequency component fq, rotation detector signal 10 and analytical result 35 suffer an aliasing error representing components outside of the measured frequency range which are introduced when digital sampling is carried out. Therefore, the second conventional electric motor control device fails to determine accurate frequency characteristics.

Problems of the second conventional electric motor control device will be described in detail below.

As shown in FIG. 3, motion command signal 9 generated by analyzing device 31' has frequency components up to maximum frequency component frmax which include those frequency components in excess of maximum measured frequency component fq. When motion command signal 9 having the frequencies shown in FIG. 3 is used, if mechanical resonances f4, f5 are present at frequencies higher than maximum measured frequency component fq and lower than maximum frequency component frmax, then motion command signal 9 excites mechanical resonances f4, f5 outside of the measured frequency range, and the components of mechanical resonances f4, f5 are contained in rotation detector signal 10. Because mechanical resonances f4, f5 have frequencies higher than maximum measured frequency fq, if digital sampling is carried out, then an aliasing error occurs to cause mechanical resonances f4, f5 to be observed apparently as f4', f5'. Since analytical result 35 represents solid-line components with broken-line components added thereto, no proper frequency characteristics can be evaluated. When a signal having a frequency higher than maximum measured frequency fq is processed for digital sampling, an aliasing error occurs which causes a true high-frequency waveform to be recognized in error as a low-frequency waveform. The relationship between sampling interval Δt and maximum measured frequency fq is a known fact referred to as the sampling theorem, and is expressed by the equation (1) below. As a result, frequency characteristics including components that are not actually present are output as shown in FIG. 5.

$$f_q = \frac{1}{2 \times \Delta t} \quad (1)$$

For measuring the frequency characteristics of a conventional electric motor control device, it is necessary to have on hand an expensive instrument such as an FFT analyzer.

When an electric motor is operated, a movable member connected thereto is moved. The movable member of a load machine changes its characteristics depending on its position, causing a shift in the resonance frequency and the anti-resonance frequency which lower the accuracy with which to measure the frequency characteristics. In order to increase the amount of data to be measured for the purpose of averaging the data, it is necessary to collect data over a long period of time or carry out a plurality of operations and measurements. However, these requirements tend to cause problems in that the movable member moves increased distances and the measurement accuracy is further lowered, as shown in FIG. 7. Specifically, the position of the electric motor is greatly displaced from the start position due to the measurement, and hence the movable member is moved, changing the characteristics of the load machine. Consequently, the accuracy with which to measure the frequency characteristics is lowered, as when a peak is split as shown in FIG. 6.

FIG. 8 is a block diagram of a third conventional electric motor control device. The third conventional electric motor control device is different from the second conventional electric motor control device in that it has FFT analyzer 41 and signal generator 42 in place of analyzing device 31', input device 32, and output device 34 of the second conventional electric motor control device.

The third conventional electric motor control device has FFT analyzer 41 and signal generator 42 in order to perform an electric motor control process in view of the characteristics of the machine. Motion command signal 43 generated by signal generator 42 is sent to servo device 3, which sends motion command signal 43 as control signal 12 to electric motor 5, which causes transmitting mechanism 6 to move movable member 7. Rotation detector 4 transmits rotation detector signal 10 via servo device 3 to FFT analyzer 41. FFT analyzer 41 receives motion command signal 43 from signal generator 42 and rotation detector signal 44 from FFT analyzer 41, and carries out a fast Fourier transform to calculate frequency characteristics. The operator reads an anti-resonance frequency and a resonance frequency from the calculated frequency characteristics, and determines servo operation command 15 based on the read frequencies. The operator needs to manually enter servo operation command 15 into servo device 3. Consequently, it has been customary for the operator to adjust the electric motor control device with a large expenditure of labor and time.

Heretofore, there have been various methods of tuning a mechanical control system having a flexible structure which is approximated by a two-inertia system. For example, Japanese laid-open patent publication No. 10-275003 discloses a vibration suppressing apparatus of a two-inertia resonance system for estimating a mechanical load speed and a disturbance torque through a obserber and suppressing vibrations based on the estimated mechanical load information in controlling a two-inertia system. The disclosed vibration suppressing apparatus has produced good results.

However, the conventional vibration suppressing apparatus has been problematic in that since parameters of the obserber and parameters of an PI (proportional plus integral) controller are adjusted individually, a lot of time may occasionally be required on a trial-and-error basis for adjustments.

DISCLOSURE OF THE INVENTION

It is an object of the present invention to provide an electronic motor control device which is capable of performing an electronic motor control process matching a controlled object without the need for an inspective analysis carried out by operators with professional knowledge and inspectors with professional knowledge in combination with a special instrument located outside of the electronic motor control device.

Another object of the present invention is to provide an electronic motor control device which calculates analytical results of proper frequency characteristics and performs an appropriate electronic motor control process easily and inexpensively.

Still another object of the present invention is to provide a method of controlling an electronic motor control device, which is capable of accurately measuring the frequency characteristics of a mechanical system.

Yet another object of the present invention is to provide an electronic motor control device which can suppress vibrations of a speed control system and which is capable of simultaneously adjusting parameters of a vibration suppressor and an I-P controller theoretically with one parameter easier than heretofore.

Yet still another object of the present invention is to provide an electronic motor control device which is capable of simultaneously adjusting parameters of a vibration inhibitor, a speed controller, and a position controller while achieving both an I-P control (integral plus proportional control) process and a PI control process for a speed control system and a position control system whose mechanical characteristics are of a two-inertia system.

A further object of the present invention is to provide an electronic motor control device which is capable of simultaneously adjusting parameters of a vibration inhibitor and a speed controller and a control parameter while achieving both an I-P control process and a PI control process for a speed control system for controlling a machine load speed and a position control system for controlling a machine load position, whose mechanical characteristics are approximated by a two-inertia system.

A still further object of the present invention is to provide a method of controlling an electronic motor control device, which is capable of adjusting the motor control device inexpensively and easily.

According to an aspect of the present invention, the frequency of any one of a motion signal equivalent to a motion signal sent from a servo device to an electric motor, a rotational speed signal of the electric motor, a position signal of a movable member of a machine, and a sensor signal representing the acceleration, speed, strain, etc. of the machine is analyzed, and a new electric motor control process is performed in view of the analytical result.

With the above arrangement, an electronic motor control process matching a controlled object can be performed without the need for operators and inspectors with professional knowledge.

According to a second aspect of the present invention, an analyzing device generates a motion command signal which does not contain unwanted high-frequency components outside of a measured frequency range so that no aliasing error is generated upon a frequency analysis, and analyzes the frequency of the motion command signal and the frequency of a rotation detector signal.

Since the motion command signal generated by the analyzing device contains frequency components lower than the maximum measured frequency, it does not excite mechanical resonances at frequencies higher than the maximum measured frequency. As the rotational detector signal does not contain frequency components higher than the maximum measured frequency and no aliasing error is generated, an anti-resonance point and a resonance point can properly be observed, and a correct analytical result is obtained. Therefore, the electric motor control device can be evaluated, making it possible to set a new servo operation command for carrying out an optimum electric motor control process.

According to a third aspect of the present invention, motion command signals output from a processing device to a servo device are executed symmetrically in normal and reverse directions of rotation of an electric motor.

With the above arrangement, a displacement of a movable member due to the operation of an electric motor is canceled out, thus removing causes of errors due to the position of the movable member at the time frequency characteristics are measured, so that the frequency characteristics can be measured accurately.

Of the motion command signals, low-frequency components have smaller amplitudes and high-frequency components have larger amplitudes, thus reducing the displacement of the movable member due to the operation of the electric motor, so that the frequency characteristics can be measured more accurately.

According to a fourth aspect of the present invention, a processing device calculates frequency characteristics from a motion command signal and a rotation detector signal, and a resonance frequency and an anti-resonance frequency are automatically calculated from the shape of the frequency characteristics. An electric motor control device is automatically adjusted based on the calculated results.

Only by using the processing device which is inexpensive and giving simple input information thereto, an appropriate electric motor control process is automatically adjusted easily and quickly.

According to a fifth aspect of the present invention, an electric motor control device has a speed controller for being supplied with a speed command, performing an I-P control process to determine a torque command in order to bring an electric motor speed into conformity with the speed command, a current controller for being supplied with a torque command and energizing an electric motor, and a detector for detecting an electric motor current and the electric motor speed, the electric motor control device also having a vibration suppressor for calculating a torsional angular speed from the electric motor speed and a machine load speed and suppressing vibrations using the torsional angular speed, and means for simultaneously adjusting parameters of the speed controller and parameters of the vibration suppressor.

With respect to a speed control system, one parameter value of speed loop gain Kv, integral time constant 1/Ti, torsional angle gain Ks, and torsional angular velocity gain Ksd is theoretically obtained. Therefore, the parameters of the vibration suppressor and the I-P controller can simultaneously be adjusted. The electric motor can be controlled in speed highly responsively while keeping a 2-inertia system stable without having to increase and lower a target response and exciting vibrations of a machine system.

According to a sixth aspect of the present invention, an electric motor control device has a speed controller for being supplied with a speed command and determining a torque command in order to bring an electric motor speed into conformity with the speed command, a current controller for being supplied with a torque command and energizing an electric motor, and a detector for detecting an electric motor current, an electric motor speed, and a machine load speed, the electric motor control device also having a vibration suppressor having a parameter $\alpha(0 \leq \alpha \leq 1)$ to continuously switch between an I-P control process and a PI control process, for calculating a torsional angular speed from the electric motor speed and the machine load speed and suppressing vibrations using the torsional angular speed, and means for simultaneously adjusting parameters of the speed controller and parameters of the vibration suppressor.

With respect to a speed control system and a position control system, the parameter values of speed loop gain Kv, integral time constant 1/Ti, torsional angle gain Ks, torsional angular velocity gain Ksd, and position loop gain Kp, which are effective for both the I-P control process and the PI control process, are easily obtained. Therefore, the parameters of the vibration suppressor, the speed controller, and a position controller can simultaneously be adjusted. If a target response is to be changed, then the parameters can be adjusted stably by changing a target response frequency ω. A settling time can be shortened by changing ξ in association with parameter α.

According to a seventh aspect of the present invention, an electric motor control device has a speed controller for being supplied with a speed command and determining a torque command in order to bring a machine load speed into conformity with the speed command, a current controller for being supplied with a torque command and energizing an electric motor, and a detector for detecting an electric motor current, an electric motor speed, and the machine load speed, the electric motor control device also having a vibration suppressor having a parameter $\alpha(0 \leq \alpha \leq 1)$ to continuously switch between an integral plus proportional control process and a proportional plus integral control process, for calculating a torsional angular velocity from the electric motor speed and the machine load speed and suppressing vibrations using the torsional angular speed, and means for simultaneously adjusting parameters of the speed controller and parameters of the vibration suppressor.

With respect to a speed control system for controlling a machine load speed and a position control system for controlling a machine load position, the parameter values of speed loop gain Kv, integral time constant 1/Ti, torsional angle gain Ks, torsional angular velocity gain Ksd, and position loop gain Kp, which are effective for both the I-P control process and the PI control process, are easily obtained. Therefore, the parameters of the vibration suppressor, the speed controller, and a position controller can simultaneously be adjusted. If a target response is to be changed, then the parameters can be adjusted stably by changing a target response frequency ω. A settling time can be shortened by changing ξ in association with parameter α.

BEST MODE FOR CARRYING OUT THE INVENTION

Figure 1:
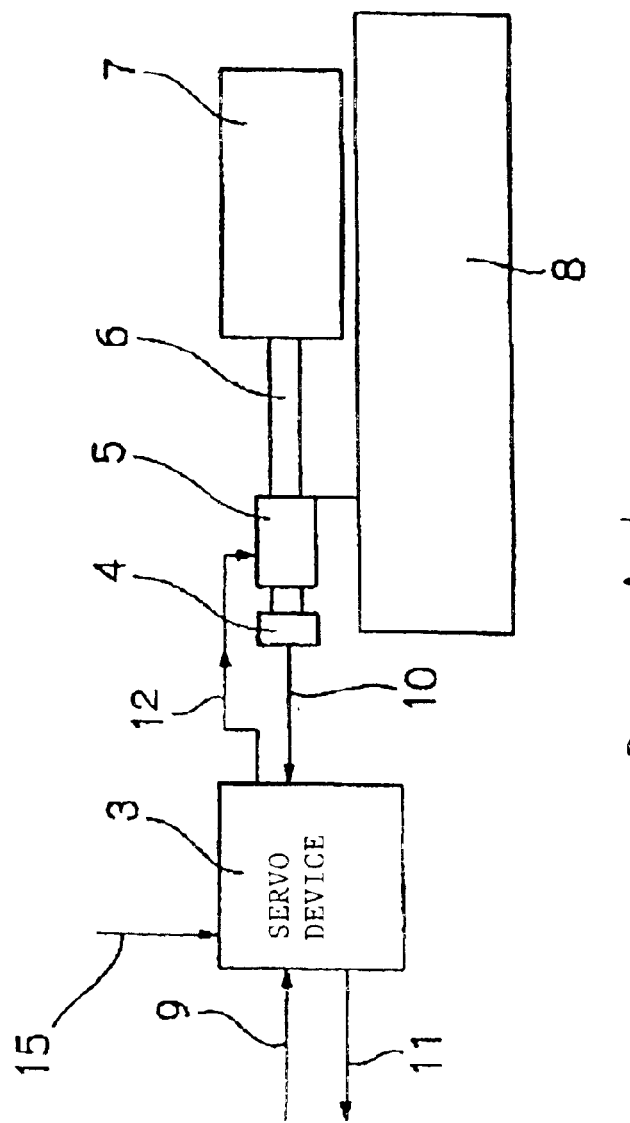
FIG. 1 is a block diagram of a first conventional electric motor control device.
Figure 2:
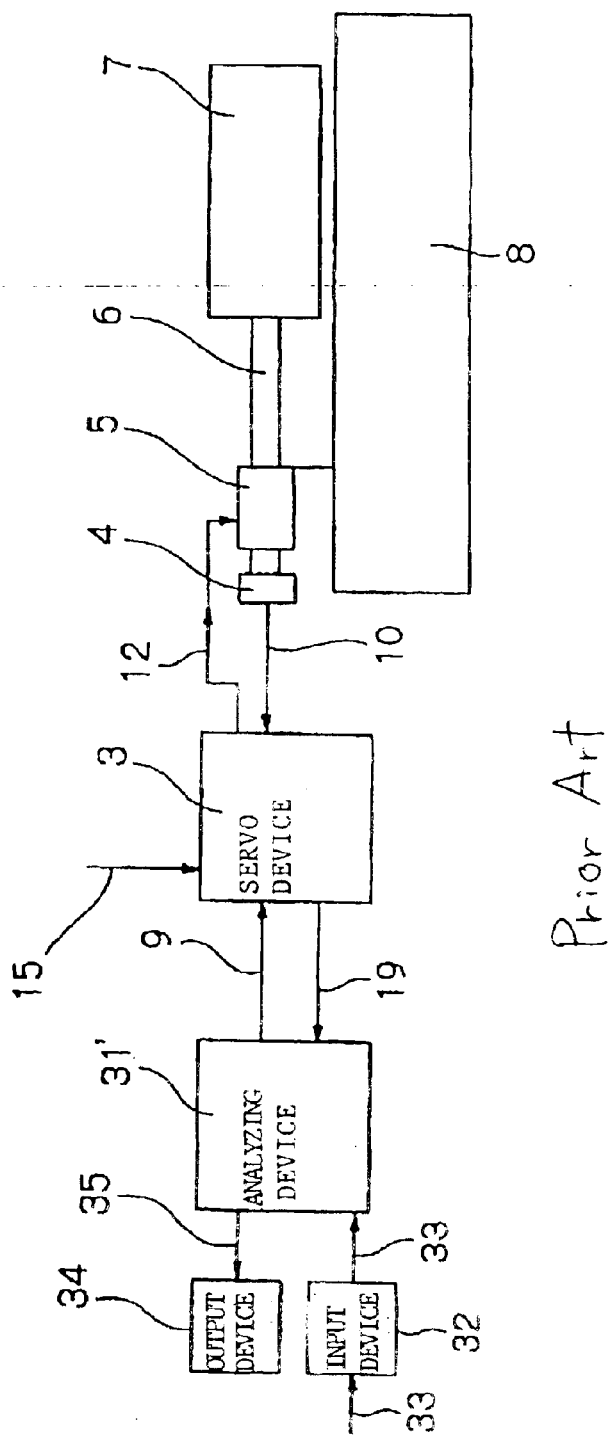
FIG. 2 is a block diagram of a second conventional electric motor control device.
Figure 3:
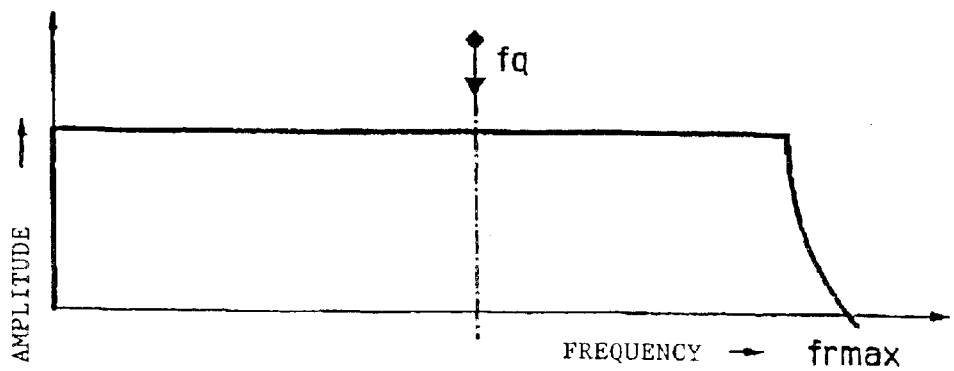
FIG. 3 is a graph showing the results of a frequency analysis of a motion command signal in the second conventional electric motor control device.
Figure 4:
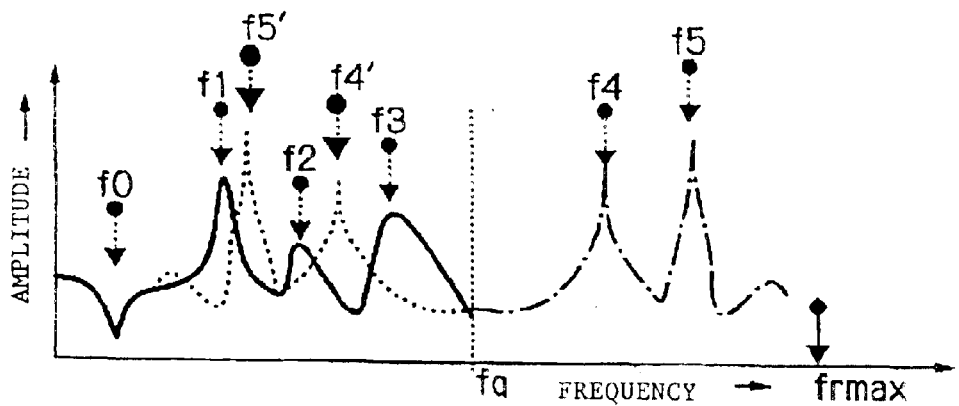
FIG. 4 is a graph showing the analytical result of the second conventional electric motor control device.
Figure 5:
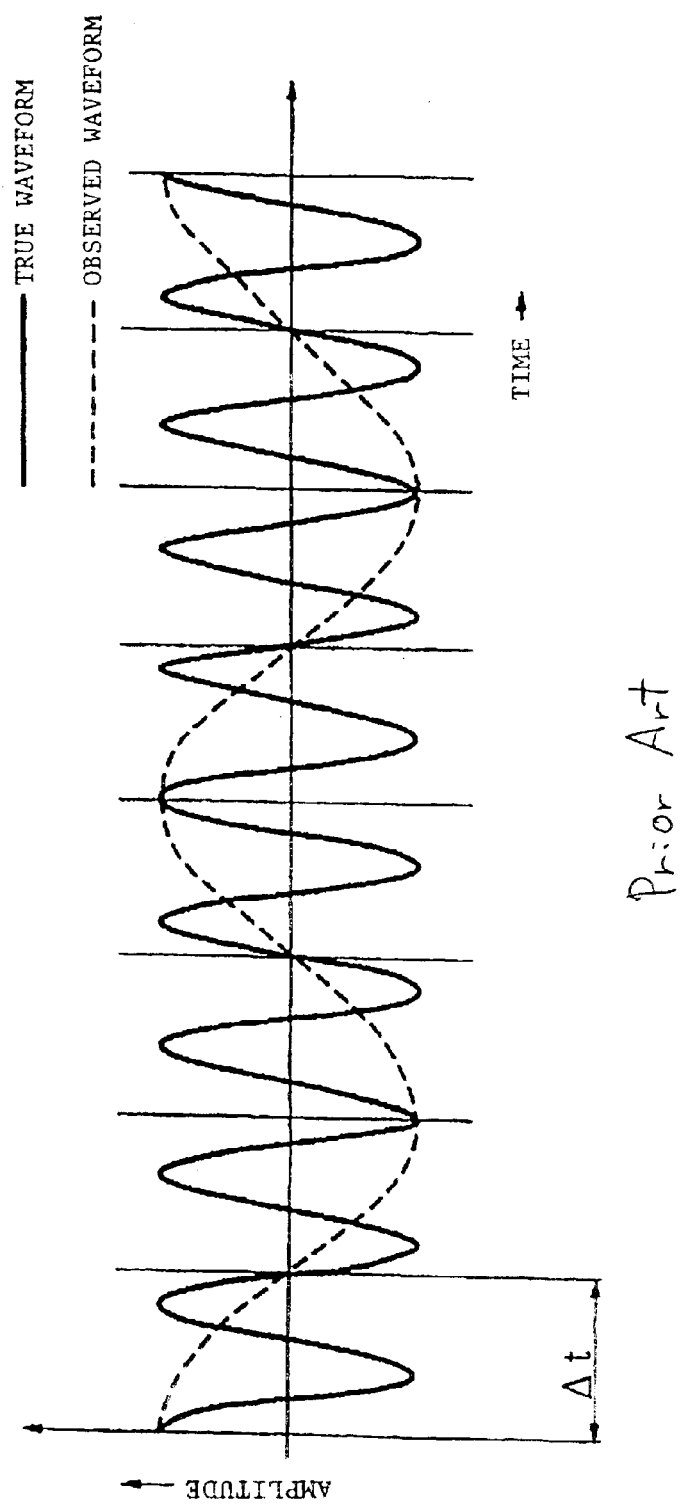
FIG. 5 is a diagram showing the principle of how an aliasing error is generated in the second conventional electric motor control device.
Figure 6:
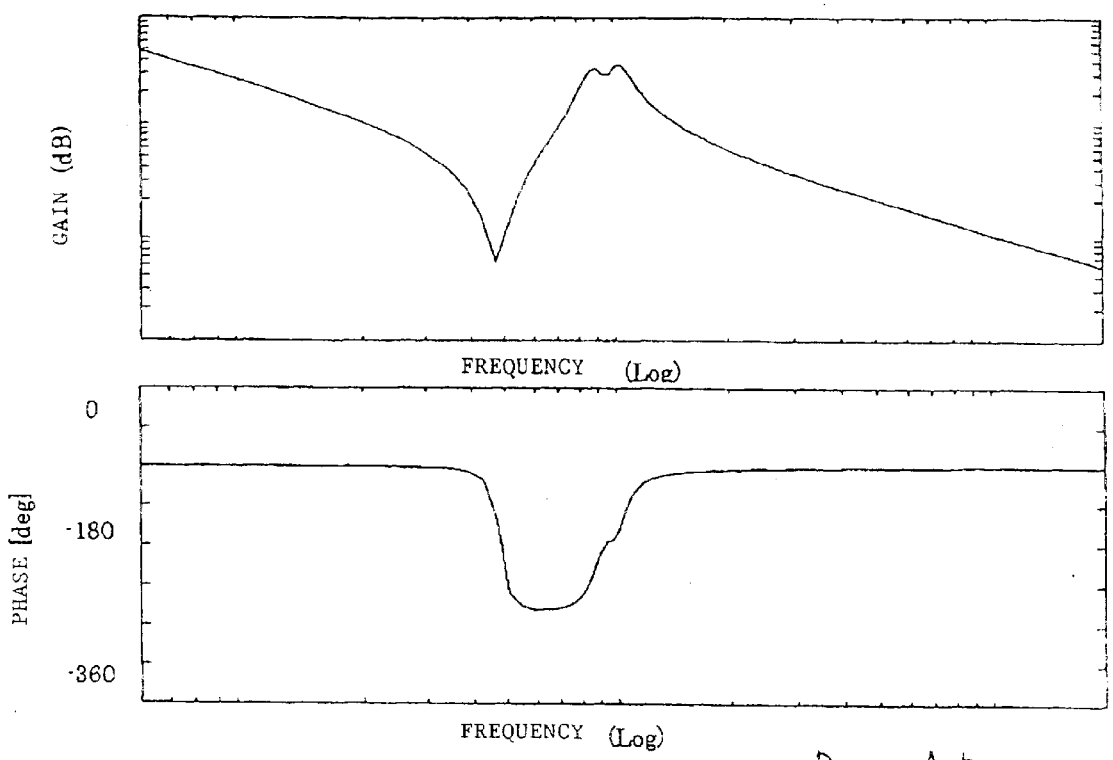
FIG. 6 is a Bode diagram showing the frequency characteristics of a conventional electric motor control device.
Figure 7:
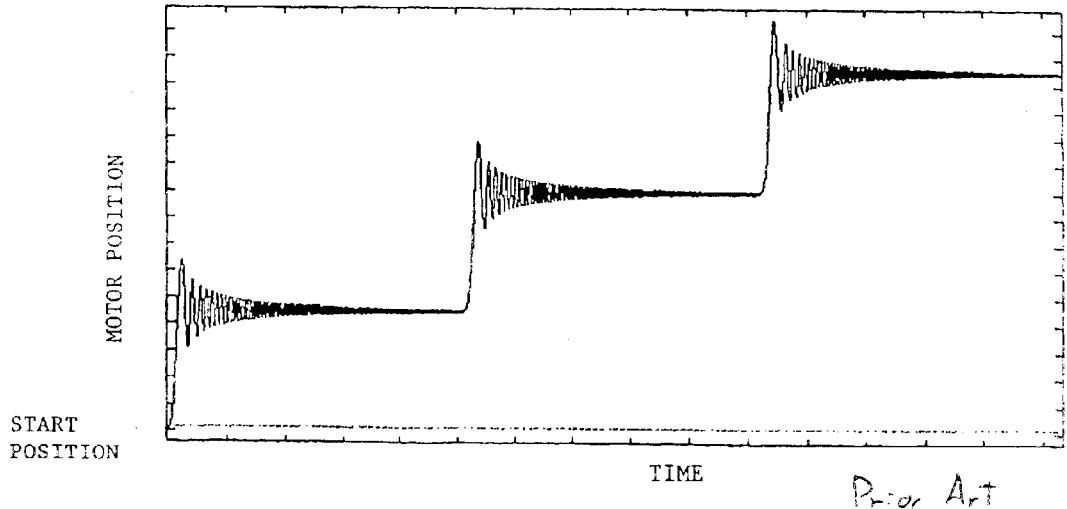
FIG. 7 is a diagram showing positions of an electric motor at the time the frequency characteristics of the conventional electric motor control device are measured.
Figure 8:
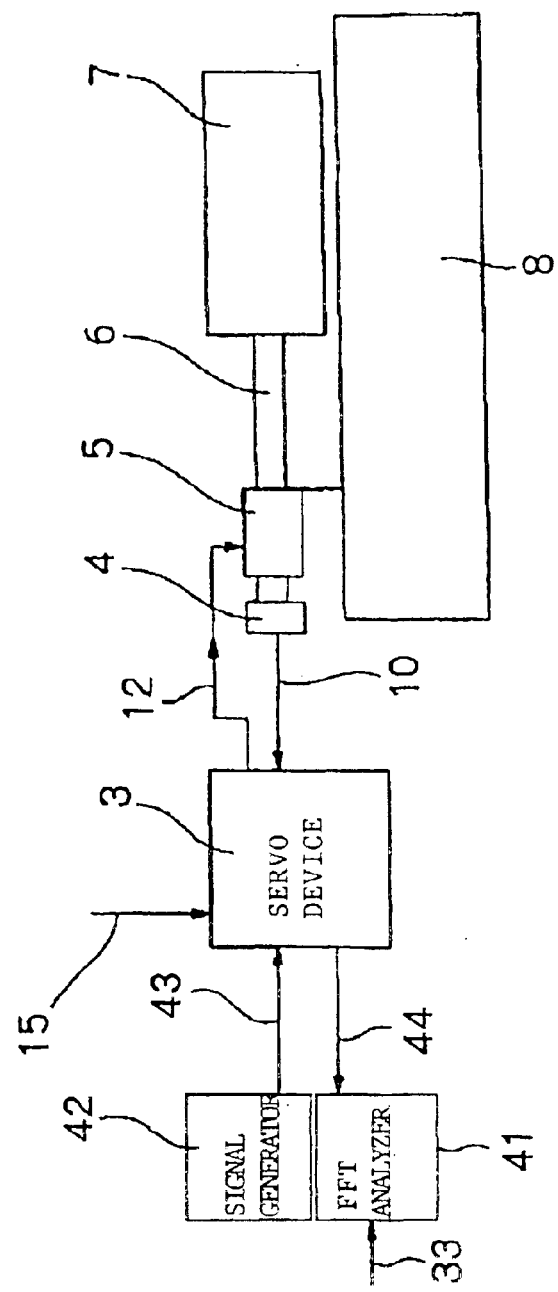
FIG. 8 is a block diagram of a third conventional electric motor control device.
Figure 9:
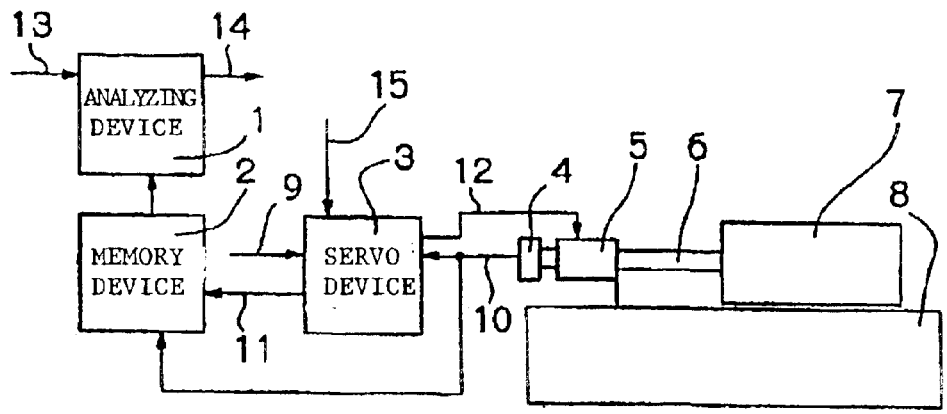
FIG. 9 is a block diagram of an electric motor control device according to a first embodiment of the present invention.

FIG. 9 is a block diagram of an electric motor control device according to a first embodiment of the present invention.

Electric motor 5 drives, through transmitting mechanism 6, movable member 7 of a machine which has movable member 7 and immovable member 8 for supporting movable member 7. Rotation detector 4 detects the rotational speed of electric motor 5. Servo device 3 controls electric motor 5 with input torque signal 12 based on torque command 9. Memory device 2 stores input torque signal 11 equivalent to input torque signal 9 and rotational speed signal 10 from rotation detector 4. Analyzing device 1 analyzes the frequencies of input torque signal 11 and rotational speed signal 10 with analysis command 13, and outputs analytic result 14 as servo operation command 15 to servo device 3. Servo operation command 15 refers to a command for changing a parameter of servo device 3 and giving analytic result 14 as a parameter of servo device 3.

Operation of the electric motor control device according to the first embodiment of the present invention will be described below. When torque signal 9 such as a random-wave signal, a slow-sweep sine-wave signal, a fast-sweep sine-wave signal, a step-wave signal, or an impact torque signal is given as a motion command signal to servo device 3, servo device 3 sends motion signal (input torque signal) 12 corresponding to torque signal 9 to electric motor 5. Electric motor 5 is operated, causing transmitting mechanism 6 to move movable member 7, which generates vibrations. Rotation detector 4 detects the rotational speed of electric motor 5, and sends rotational speed signal 10 to memory device 2. Servo device 3 sends input torque signal 11 equivalent to input torque signal 12 to memory device 2. Memory device 2 stores input torque signal 11 and rotational speed signal 10. Analyzing device 1 analyzes the frequencies of input torque signal 11 and rotational speed signal 10 stored in memory device 2 according to an FFT (Fast Fourier Transform).

In the frequency analysis, input torque signal 11 and rotational speed signal 10 are divided at optional time intervals, frequency-analyzed, and then averaged. Result Sx of the frequency analysis of input torque signal 11 divided at the optional time interval and result Sy of the frequency analysis of rotational speed signal 10 divided at the optional time interval are determined. Result Sx of the frequency analysis of input torque signal 11 and complex conjugate Sx* of result Sx of the frequency analysis are multiplied and averaged. Result Sy of the frequency analysis of rotational speed signal 10 and complex conjugate Sx* of result Sx of the frequency analysis of input torque signal 11 are multiplied and averaged. The averaged results are calculated to determine frequency response function Hyx according to the equation (2):

$$H_{yx} = \frac{\overline{(S_y \times S_x^*)}}{\overline{(S_x \times S_x^*)}} \quad (2)$$

The frequency analysis may be carried out by the Blackman-Turkey method, an autoregressive method, a moving average method, an autoregressive moving average method, or a wavelet transform, rather than the FFT. A signal produced by converting rotational speed signal 10 into a position of the movable member 7 may be used instead of rotational speed signal 10. An equation which is mathematically equivalent to the equation (2), such as the equation (3) shown below, may be used instead of the equation (2).

$$H_{yx} = \frac{\overline{(S_y \times S_y^*)}}{\overline{(S_x \times S_x^*)}} \quad (3)$$

The frequency represented by the valleys and peaks of the amplitude of frequency response function Hyx is the natural frequency of the machine. In response to analysis command 13, analyzing device 1 can easily detect the natural frequency which represents the vibration characteristics of the machine, and output analytical result 14. By giving servo operation command 15 to servo device 3 in view of analytical result 14, a new electric motor control process is carried out. In the above embodiment, electric motor 5 is used to generate vibrations. However, an external vibrating device may be installed to generate vibrations, and an external vibrating signal may be used instead of input torque signal 12.

Figure 10:
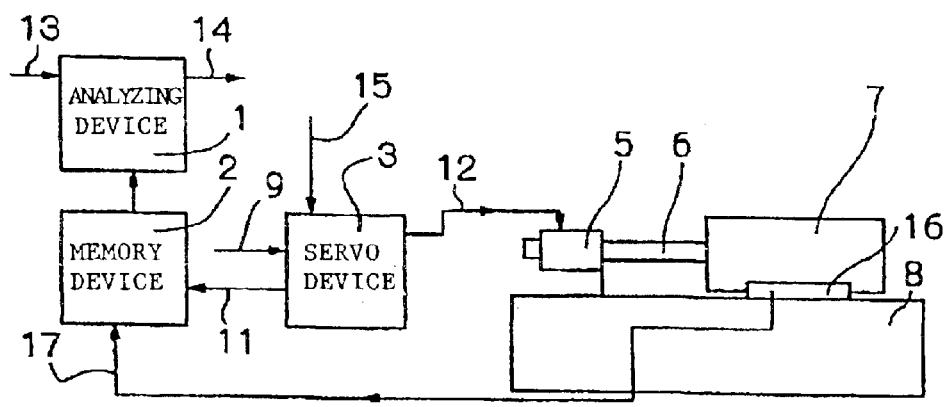
FIG. 10 is a block diagram of an electric motor control device according to a second embodiment of the present invention.

FIG. 10 is a block diagram of an electric motor control device according to a second embodiment of the present invention.

In the second embodiment, position detector 16 is mounted on movable member 7 in the first embodiment, and movable member position signal 17 from position detector 16 is stored in memory device 2.

Operation of the electric motor control device according to the second embodiment of the present invention will be described below. Command signal 9 such as a random-wave signal, a slow-sweep sine-wave signal, a fast-sweep sine-wave signal, or an impact torque signal is sent to servo device 3. Servo device 3 sends motion signal (input torque signal) 12 corresponding to motion command signal (torque signal) 9 to electric motor 5. Electric motor 5 is operated, causing transmitting mechanism 6 to move movable member 7, which generates vibrations. Position detector 16 detects the position of movable member 7, and sends movable member position signal 17 to memory device 2. Servo device 3 sends input torque signal 11 equivalent to input torque signal 12 to memory device 2. Memory device 2 stores input torque signal 11 and movable member position signal 17. Analyzing device 1 analyzes the frequencies of input torque signal 11 and movable member position signal 17 according to an FFT (Fast Fourier Transform).

In the frequency-analysis, input torque signal 11 and movable member position signal 17 are divided at optional time intervals, frequency-analyzed, and then averaged. Result Sx of the frequency analysis of input torque signal 11 divided at the optional time interval and result Sy of the frequency analysis of movable member position signal 17 divided at the optional time interval are determined. Result Sx of the frequency analysis of input torque signal 11 and complex conjugate Sx* of result Sx of the frequency analysis are multiplied and averaged. Result Sy of the frequency analysis of movable member position signal 17 and complex conjugate Sx* of result Sx of the frequency analysis of input torque signal 11 are multiplied and averaged. The averaged results are calculated to determine frequency response function Hyx according to the above equation (1).

The frequency analysis may be carried out by the Blackman-Turkey method, an autoregressive method, a moving average method, an autoregressive moving average method, or a wavelet transform, rather than the FFT. An equation which is mathematically equivalent to the equation (2), such as the equation (3) shown above, may be used instead of the equation (2). The frequency represented by the valleys and peaks of the amplitude of frequency response function Hyx is the natural frequency of the machine. In response to analysis command 13, analyzing device 1 can easily detect the natural frequency which represents the vibration characteristics of the machine, and output analytical result 14. By giving servo operation command 15 to servo device 3 in view of analytical result 14, a new electric motor control process is carried out. In the above embodiment, electric motor 5 is used to generate vibrations. However, an external vibrating device may be installed to generate vibrations, and an external vibrating signal may be used instead of input torque signal 12.

Figure 11:
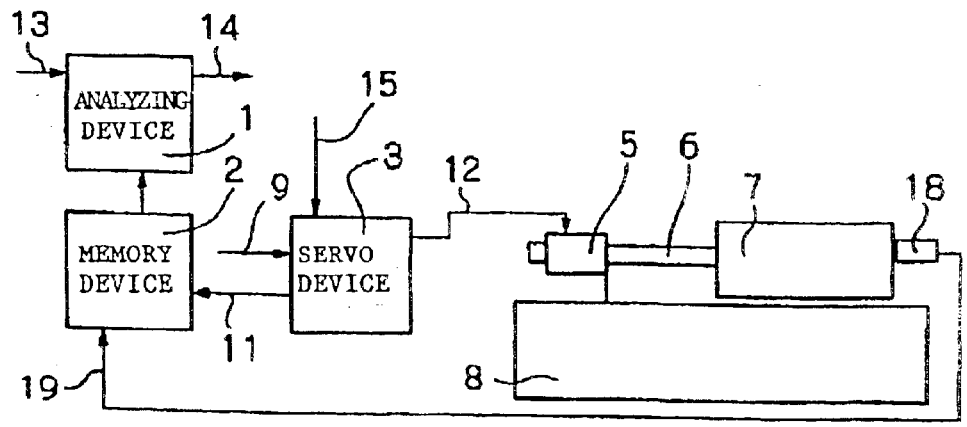
FIG. 11 is a block diagram of an electric motor control device according to a third embodiment of the present invention.

FIG. 11 is a block diagram of an electric motor control device according to a third embodiment of the present invention.

In the second embodiment, measurement sensor 18 is mounted on movable member 7 in the first embodiment, and sensor signal 19 from measurement sensor 18 is stored in memory device 2.

Operation of the electric motor control device according to the third embodiment of the present invention will be described below. Motion command signal 9 such as a random-wave signal, a slow-sweep sine-wave signal, a fast-sweep sine-wave signal, or an impact torque signal is sent to servo device 3. Servo device 3 sends motion signal (input torque signal) 12 corresponding to motion command signal (torque signal) 9 to electric motor 5. Electric motor 5 is operated, causing transmitting mechanism 6 to move movable member 7. Measurement sensor 18 detects vibrations of movable member 7, and sends sensor signal 19 to memory device 2. Measurement sensor 18 may be mounted on immovable member 8 or transmitting mechanism 6. Measurement sensor 18 comprises an acceleration meter, a speed meter, a displacement meter, a strain meter, or the like. Accordingly, sensor signal 19 represents an acceleration, a speed, a displacement, a strain, or the like.

Servo device 3 sends input torque signal 11 equivalent to input torque signal 12 to memory device 2. Memory device 2 stores input torque signal 11 and sensor signal 19. Analyzing device 1 analyzes the frequencies of input torque signal 11 and sensor signal 19 according to an FFT (Fast Fourier Transform).

In the frequency analysis, input torque signal 11 and sensor signal 19 are divided at optional time intervals, frequency-analyzed, and then averaged. Result Sx of the frequency analysis of input torque signal 11 divided at the optional time interval and result Sy of the frequency analysis of sensor signal 19 divided at the optional time interval are determined. Result Sx of the frequency analysis of input torque signal 11 and complex conjugate Sx* of result Sx of the frequency analysis are multiplied, and averaged. Result Sy of the frequency analysis of sensor signal 19 and complex conjugate Sx* of result Sx of the frequency analysis of input torque signal 11 are multiplied and averaged. The averaged results are calculated to determine frequency response function Hyx according to the above equation (2).

The frequency analysis may be carried out by the Blackman-Turkey method, an autoregressive method, a moving average method, an autoregressive moving average method, or a wavelet transform, rather than the FFT.

An equation which is mathematically equivalent to the equation (2), such as the equation (3) shown above, may be used instead of the equation (2). The frequency represented by the valleys and peaks of the amplitude of frequency response function Hyx is the natural frequency of the machine. In response to analysis command 13, analyzing device 1 can easily detect the natural frequency which represents the vibration characteristics of the machine, and output analytical result 14. If there are a plurality of measurement sensors 18, then there are a plurality of frequency response functions Hyx, and a vibration mode is calculated from frequency response functions Hyx. Analyzing device 1 may output a vibration mode as analytical result 14.

By giving servo operation command 15 to servo device 3 in view of analytical result 14, a new electric motor control process is carried out. In the above embodiment, electric motor 5 is used to generate vibrations. However, an external vibrating device may be installed to generate vibrations, and an external vibrating signal may be used instead of input torque signal 12.

Figure 12:
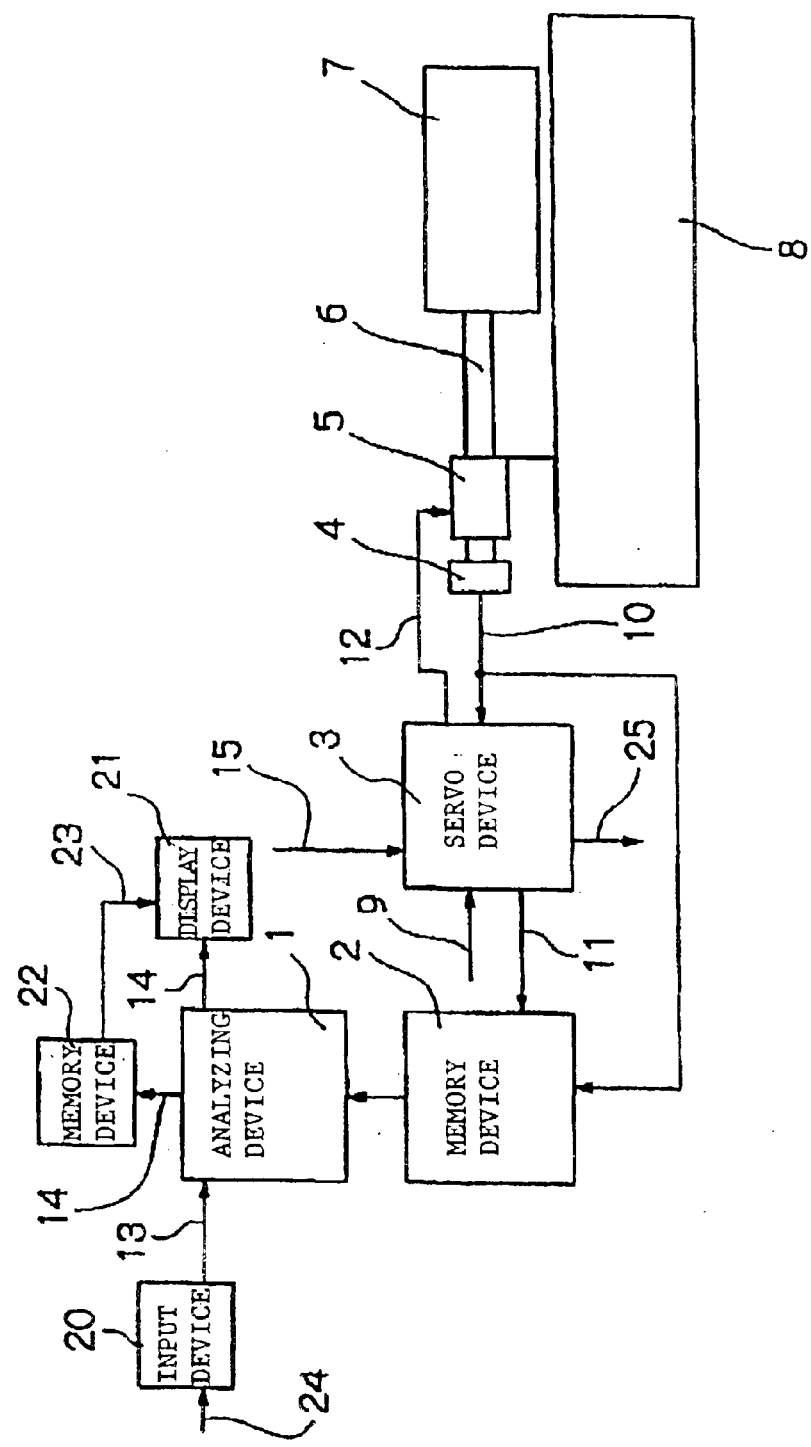
FIG. 12 is a block diagram of an electric motor control device according to a fourth embodiment of the present invention.

FIG. 12 is a block diagram of an electric motor control device according to a fourth embodiment of the present invention.

The electric motor control device according to the fourth embodiment has input device 20, display device 21, and memory device 22 added to the electric motor control device according to the first embodiment.

Display device 21 has a function to display analytical result 14 from analyzing device 1. Display device 21 may also display motion command signal (torque signal) 9, rotational speed signal 10, input torque signal 11, input torque signal 12, analysis command 13, servo operation command 15, stored data 23, and input data 24. Display device 21 may also display set data 25 of servo device 3. Memory device 22 has a function to store analytical result 14 from analyzing device 1. Memory device 22 may also store torque signal 9, rotational speed signal 10, input torque signal 11, input torque signal 12, analysis command 13, servo operation command 15, and input data 24. Memory device 22 may also store set data 25 of servo device 3. Input device 20 has an input function to receive input data 24 and gives it as analysis command 13 to analyzing device 1. Input device 20 may also input torque command 9 and servo operation command 15, and may also be used as an input device for memory device 22.

Other operational details of the electric motor control device according to the fourth embodiment are identical to those of the electric motor control device according to the first embodiment. Input device 20, display device 21, and memory device 22 may be added to the electric motor control devices according to the second and third embodiments.

Figure 13:
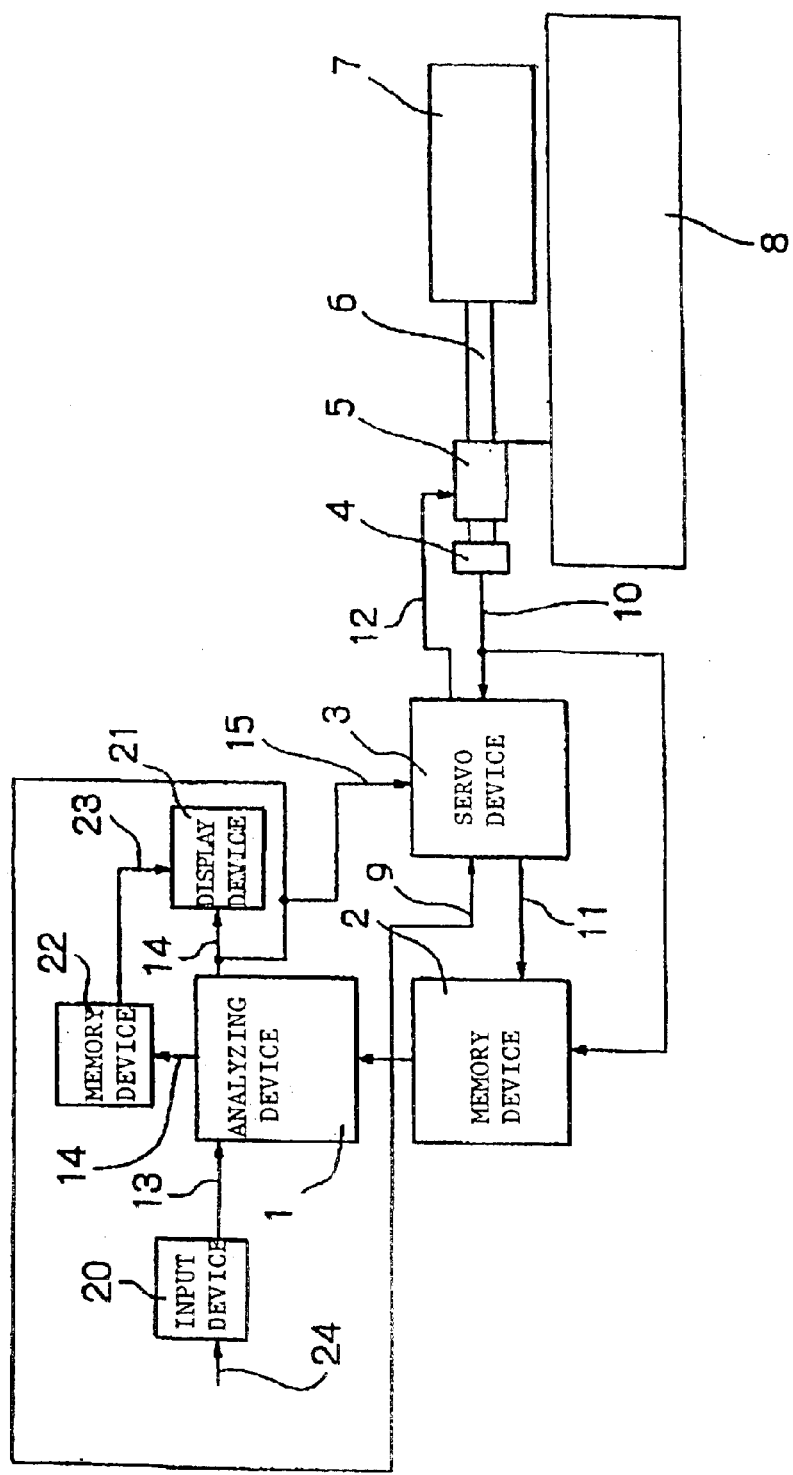
FIG. 13 is a block diagram of an electric motor control device according to a fifth embodiment of the present invention.

FIG. 13 is a block diagram of an electric motor control device according to a fifth embodiment of the present invention.

The electric motor control device according to the fifth embodiment is similar to the electric motor control device according to the fourth embodiment except that analytical result 14 output from analyzing device 1 is given as command signal 9 to servo device 3 and as servo operation command 15 to servo device 3.

The electric motor control device according to the fifth embodiment operates in a mode where electric motor is operate to vibrate the machine while servo operation command 15 is being changed by analytical result 14 and a mode where a vibrating power or torque having a constant level in the frequency domain is applied to electric motor 5 to vibrate the machine. Measurement conditions may be established optionally to set inputs and outputs of analyzing device 1, servo device 3, and memory device 22. Either one of motion command signal 9, rotational speed command 10, input torque command 11, control signal 12, analysis command 13, analytical result 14, and stored data 23 may be given to either one of motion command signal 9, analysis command 13, analytical result 14, and stored data 23.

The electric motor control devices according to the second and third embodiments may be arranged to incorporate the features of the electric motor control device according to the fifth embodiment.

Figure 14:
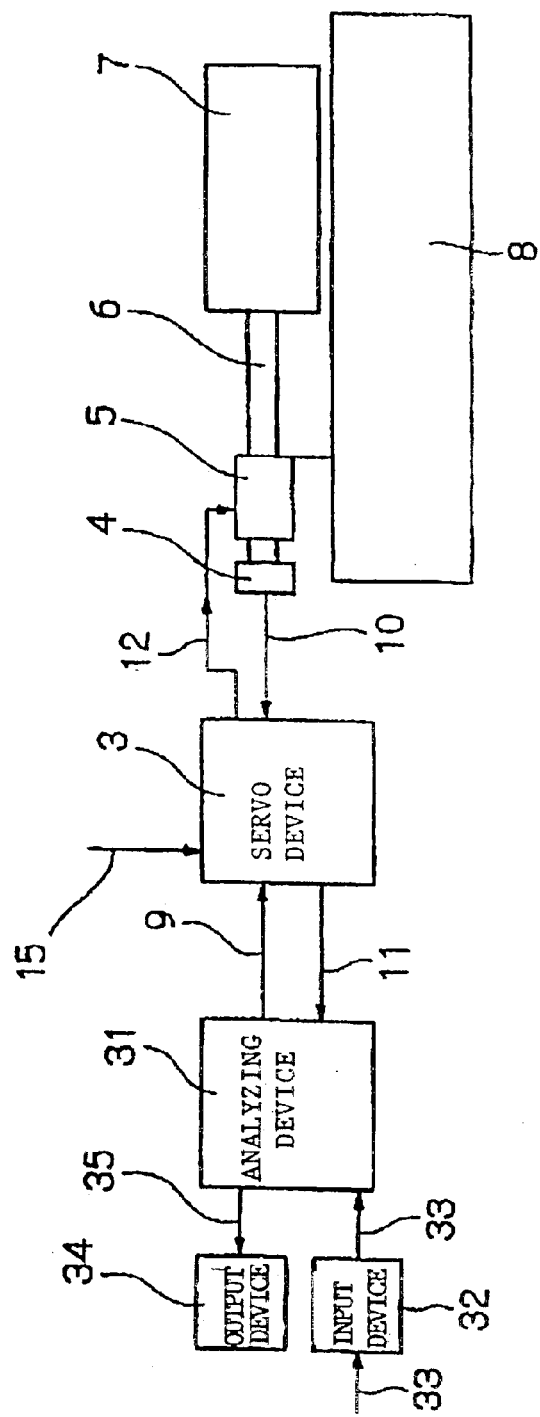
FIG. 14 is a block diagram of an electric motor control device according to a sixth embodiment of the present invention.

FIG. 14 is a block diagram of an electric motor control device according to a sixth embodiment of the present invention.

The electric motor control device according to the sixth embodiment has analyzing device 31, input device 32, and output device 34 instead of analyzing device 1 and memory device 2 of the electric motor control device according to the first embodiment.

Operation of the electric motor control device according to the sixth embodiment will be described below.

When an operation command is given from input device 32 to analyzing device 31, analyzing device 31 generates motion command signal 9 of only those frequency components lower than a maximum measured frequency. Motion command signal 9, which may be a random-wave signal, a slow-sweep sine-wave signal, a fast-sweep sine-wave signal, or the like, does not contain frequency components outside of the measured frequency range, and contains only those frequency components lower than the maximum measured frequency as indicated by a frequency analysis. The slow-sweep sine-wave signal and the fast-sweep sine-wave signal are generated by sweeping up to the maximum measured frequency, and the random-wave signal of only those frequency components lower than the maximum measured frequency is generated according to a known process described in "Spectral analysis" written by Mikio Hino (1977). The slow-sweep sine-wave signal, the fast-sweep sine-wave signal, or the random-wave signal thus generated is used as motion command signal 9. Motion command signal 9 is transmitted through servo device 3 and output therefrom as motion signal 12 equivalent to motion command signal 9, which is sent to electric motor 5. Electric motor 5 is operated, causing transmitting mechanism 6 to move movable member 7, which generates vibrations. Rotation detector 4 detects the rotation and vibrations of electric motor 5, and transmits rotational speed signal 10 through servo device 3 to analyzing device 31.

Analyzing device 31 analyzes the frequencies of motion command signal 9 and rotation detector signal 11 according to an FFT (Fast Fourier Transform) in the same manner as with the first embodiment. Analyzing device 31 outputs analytical result 35 to output device 34.

By giving new servo operation command 15 to servo device 3 based on analytical result 35 which represents the frequency characteristics of the electric motor control device, an optimum electric motor control process is carried out.

In the above embodiment, motion signal 12 is used as equivalent to motion command signal 9. However, motion signal 12 may be used as a signal containing the components of motion command signal 9 and rotation detector signal 11.

In the above embodiment, the FFT is used for the frequency analysis. However, a digital Fourier transform, the Blackman-Turkey method, an autoregressive method, a moving average method, an autoregressive moving average method, or a wavelet transform may be used.

In the above embodiment, rotation detector signal 11 is used. However, a signal converted from rotation detector signal 11, e.g., a signal generated by differentiating, integrating, or multiplying rotation detector signal 11 by a coefficient, may be used instead of rotation detector signal 11. Alternatively, a position signal, a speed signal, or an acceleration signal which is obtained from a signal measuring device for indicating the motion of the movable member 7 may be used instead of rotation detector signal 11.

In the above embodiment, motion command signal 9 and rotation detector signal 11 are divided at preset time intervals, frequency-analyzed, and averaged by the number n of divisions. However, motion command signal 9 and rotation detector signal 11 may directly be frequency-analyzed and averaged by the number n of times that electric motor 5 is operated by motion command signal 9.

In the above embodiment, analytical result 35 is output from output device 34. However, output device 34 may be replaced with a memory device ancillary to analyzing device 31, or analytical result 35 may be output from another output device through a memory device or a connection device.

In the above embodiment, electric motor 5 is used to obtain analytical result 35. However, a vibrating device may be installed outside of the electric motor control device.

Figure 15:
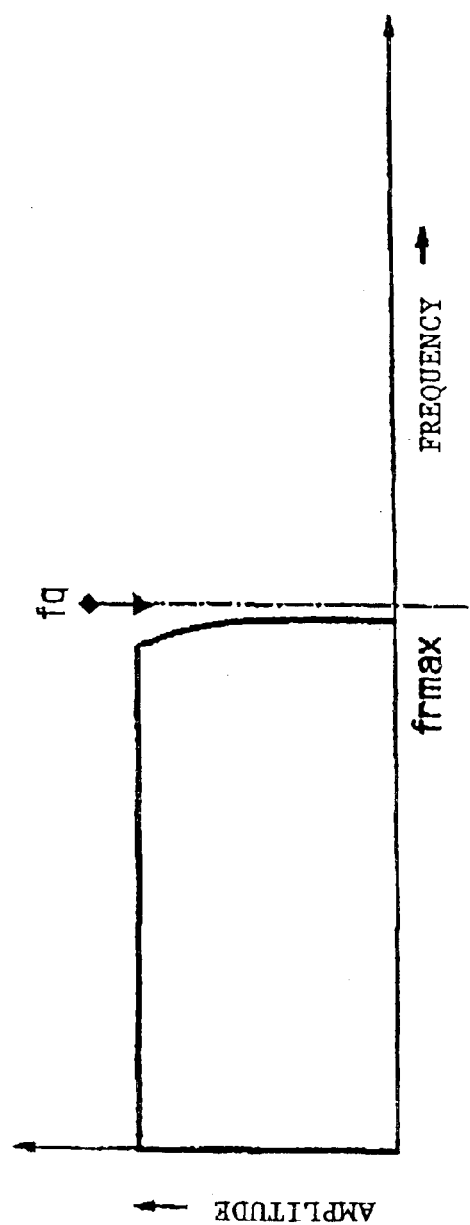
FIG. 15 is a graph showing the results of a frequency analysis of a motion command signal in the electric motor control device according to the sixth embodiment of the present invention.

FIG. 15 is a graph showing the results of a frequency analysis of motion command signal 9 in the electric motor control device according to the sixth embodiment. The results of the frequency analysis of motion command signal 9 which has been carried out by analyzing device 31 show only frequency components up to maximum frequency component frmax below maximum measured frequency component fq.

Figure 16:
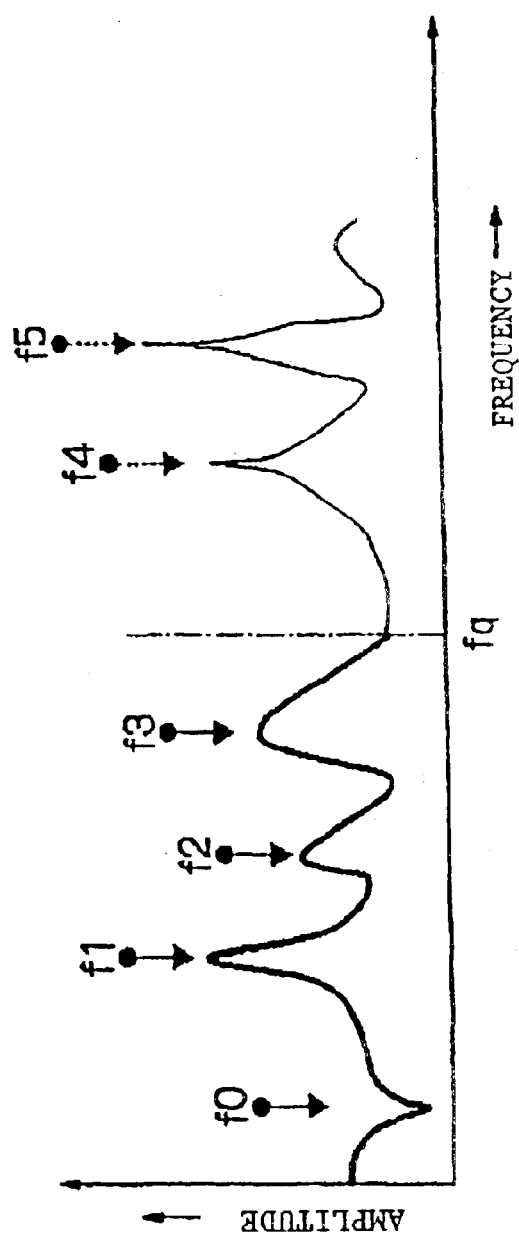
FIG. 16 is a graph showing the analytical result of the electric motor control device according to the sixth embodiment of the present invention.

FIG. 16 is a graph showing the analytical result of the electric motor control device according to the sixth embodiment of the present invention. Since motion command signal 9 generated by analyzing device 31 contains only frequency components below maximum measured frequency component fq, motion command signal 9 does not excite mechanical resonances f4, f5 whose frequencies are higher than maximum measured frequency fq. Therefore, rotation detector signal 11 does not contain f4, f5 components and is free of an aliasing error. Therefore, anti-resonance point f0 and resonance points f1, f2, f3 can properly observed, and a proper analytical result is produced. Therefore, the electric motor control device can be evaluated, making it possible to set a new servo operation command for carrying out an optimum electric motor control process.

Figure 17:
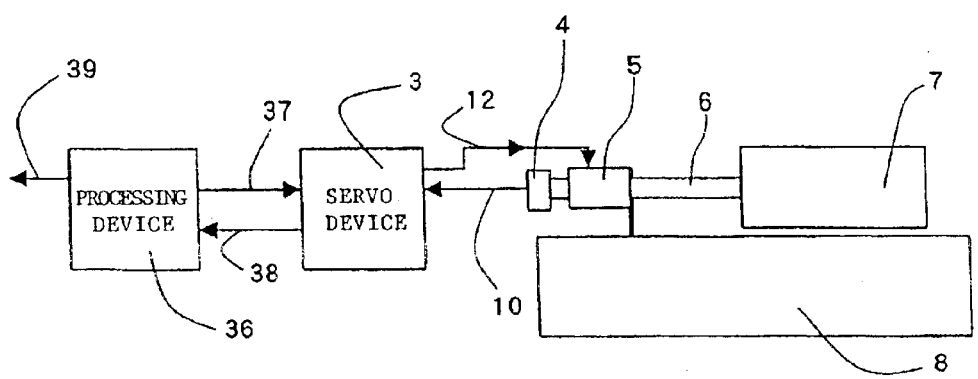
FIG. 17 is a block diagram of an electric motor control device according to a seventh embodiment of the present invention.

FIG. 17 is a block diagram of an electric motor control device according to a seventh embodiment of the present invention.

Processing device 36 generates motion command signal 37, and sends control signal 12 equivalent to motion command signal 37 via servo device 3 to electric motor 5. Electric motor 5 is operated, causing transmitting mechanism 6 to move movable member 7, so that a load machine including immovable member 8 generates vibrations. Rotation detector 4 detects the rotation and vibrations of electric motor 5, and transmits rotational speed signal 10 through servo device 3 to processing device 36. Processing device 36 analyzes the frequencies of motion command signal 37 and rotation detector signal 38, and determines frequency characteristics 39.

Figure 20:
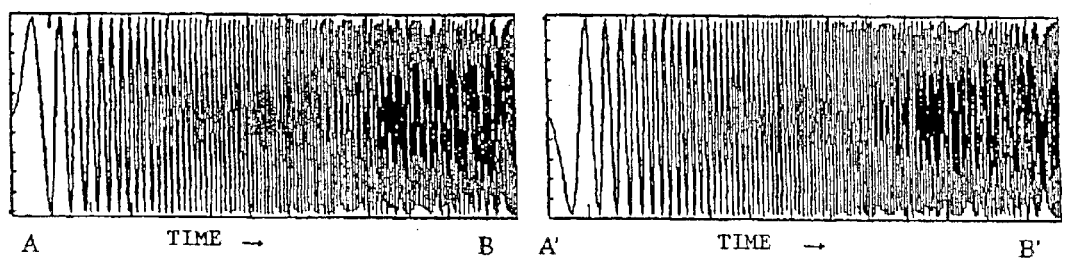
FIG. 20 is a diagram showing a first example of a motion command signal in the electric motor control device according to the seventh embodiment of the present invention.
Figure 21:
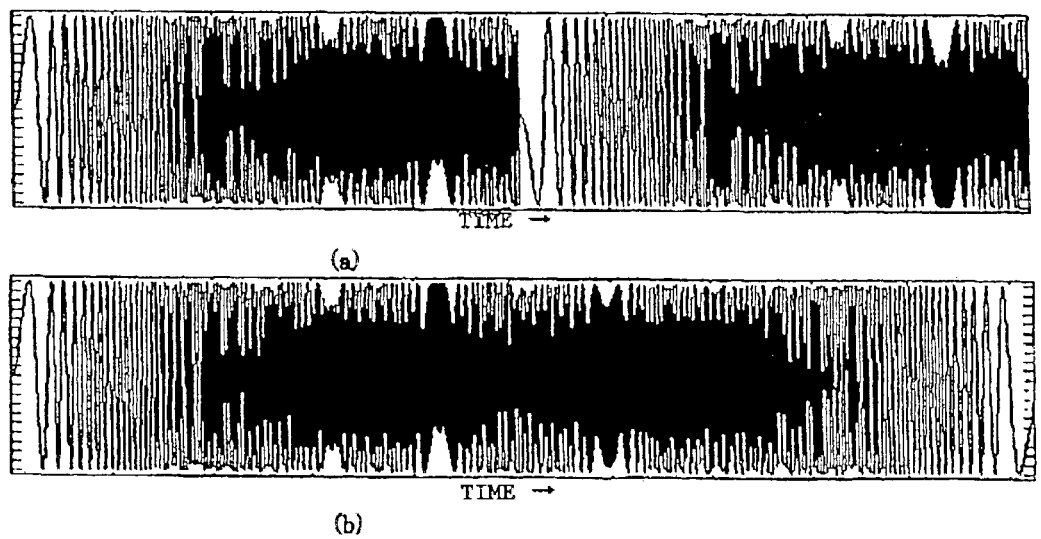
FIG. 21 is a diagram showing a second example of a motion command signal in the electric motor control device according to the seventh embodiment of the present invention.

As shown in FIG. 20, the electric motor control device according to the seventh embodiment measures frequency characteristics with a repetition of motion command signal 37 which causes the electric motor to rotate in a normal direction and motion command signal 37 which causes the electric motor to rotate in a reverse direction. Alternatively, as shown in FIG. 21, the electric motor control device according to the seventh embodiment measures frequency characteristics with a succession of motion command signals 37 including signals to cause the electric motor to rotate in a normal direction and a reverse direction.

Figure 18:
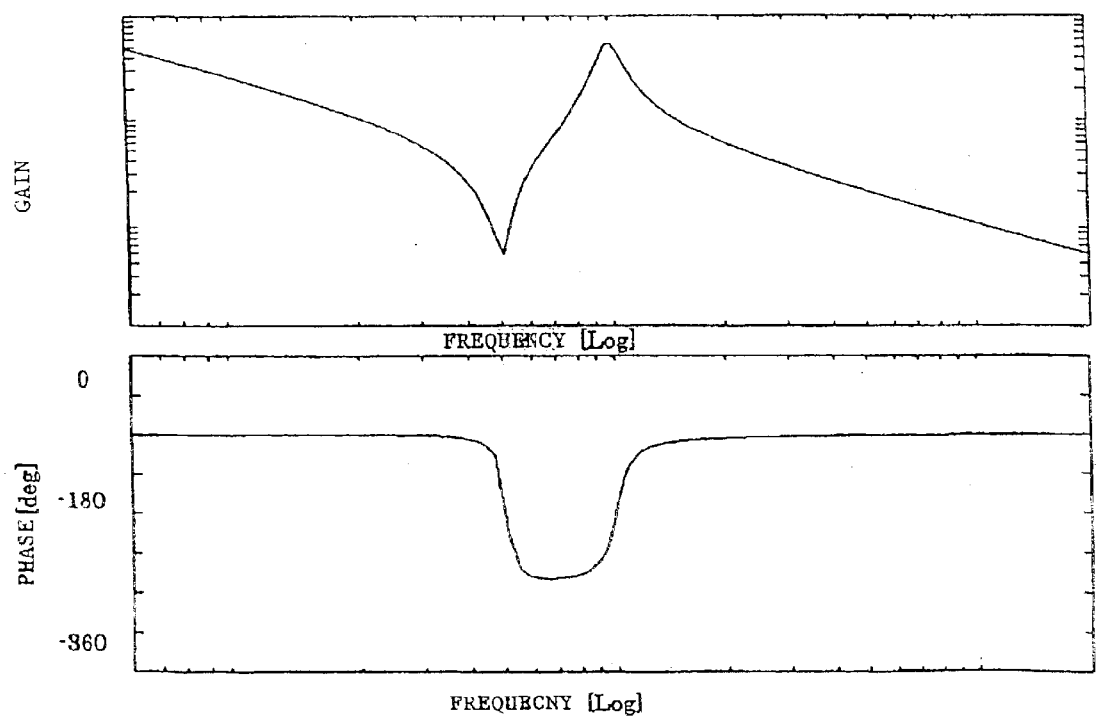
FIG. 18 is a Bode diagram showing the frequency characteristics of the electric motor control device according to the seventh embodiment of the present invention.
Figure 22:
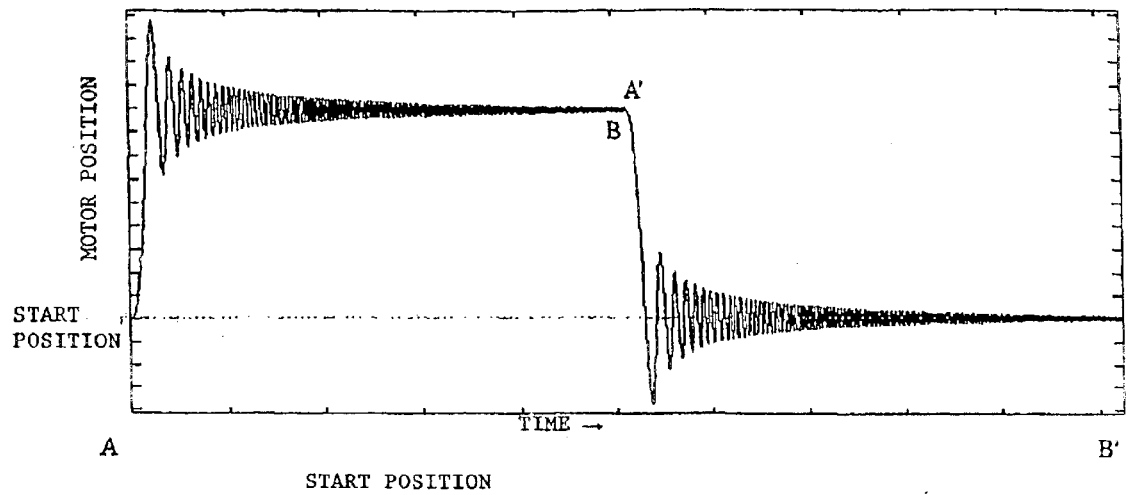
FIG. 22 is a diagram showing positions of an electric motor at the time the frequency characteristics of the electric motor control device according to the seventh embodiment of the present invention are measured.

FIG. 22 is a diagram showing positions of the electric motor at the time the frequency characteristics of the electric motor control device according to the seventh embodiment are measured. Since the electric motor is operated by motion command signal 37 described above and frequency characteristics are measured, the electric motor is positionally shifted, moving movable member 7. The electric motor is positionally displaced in the reverse direction, returning movable member 7 to its original position. Therefore, even if the electric motor control device is operated an increased number of times or for a long period of time, it is possible to measure frequency characteristics with accuracy as the final position of movable member 7 remains unchanged, as shown in FIG. 18.

In the present embodiment, motion command signal 37 first causes the electric motor to rotate in a normal direction and then in a reverse direction. However, motion command signal 37 may first causes the electric motor to rotate in a reverse direction and then in a normal direction. In FIG. 21($a$), motion command signal 37 is a signal which first causes the electric motor to rotate in a normal direction from a low frequency, then sweeps up to a high frequency, and causes the electric motor to rotate in a reverse direction by sweeping from a high frequency to a low frequency. However, as shown in FIG. 21($b$), motion command signal 37 may be a signal which first causes the electric motor to rotate in a normal direction from a low frequency, then sweeps a sine wave up to a high frequency, and causes the electric motor to rotate in a reverse direction by sweeping from a low frequency to a high frequency. Motion command signal 37 may be a signal other than the combinations shown in FIGS. 20 and 21 insofar as it is a signal for canceling out displacements.

Figure 23:
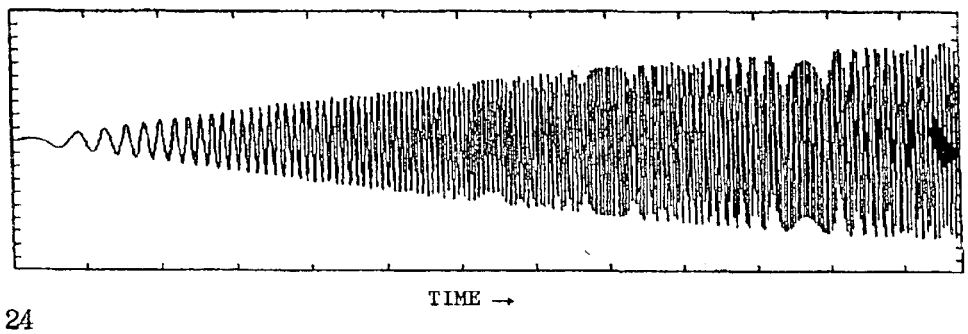
FIG. 23 is a diagram showing a motion command signal in the electric motor control device according to the modification of the seventh embodiment of the present invention.

According to a modification of the seventh embodiment, as shown in FIG. 23, motion command signal 37 contains smaller low-frequency components and larger high-frequency components.

Figure 19:
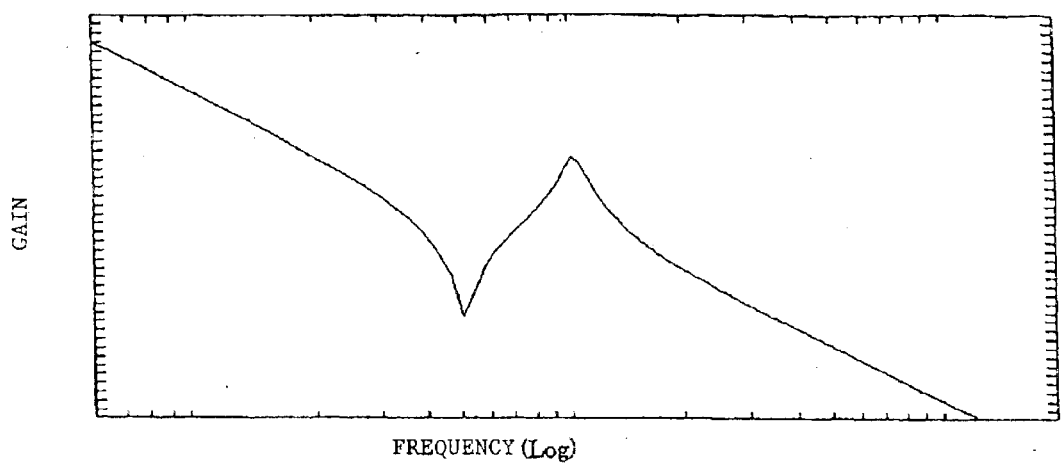
FIG. 19 is a diagram of a gain curve showing the frequency characteristics of an electric motor control device according to a modification of the seventh embodiment of the present invention.

FIG. 19 is a diagram of a gain curve showing the frequency characteristics of the electric motor control device according to the modification of the seventh embodiment of the present invention.

Figure 24:
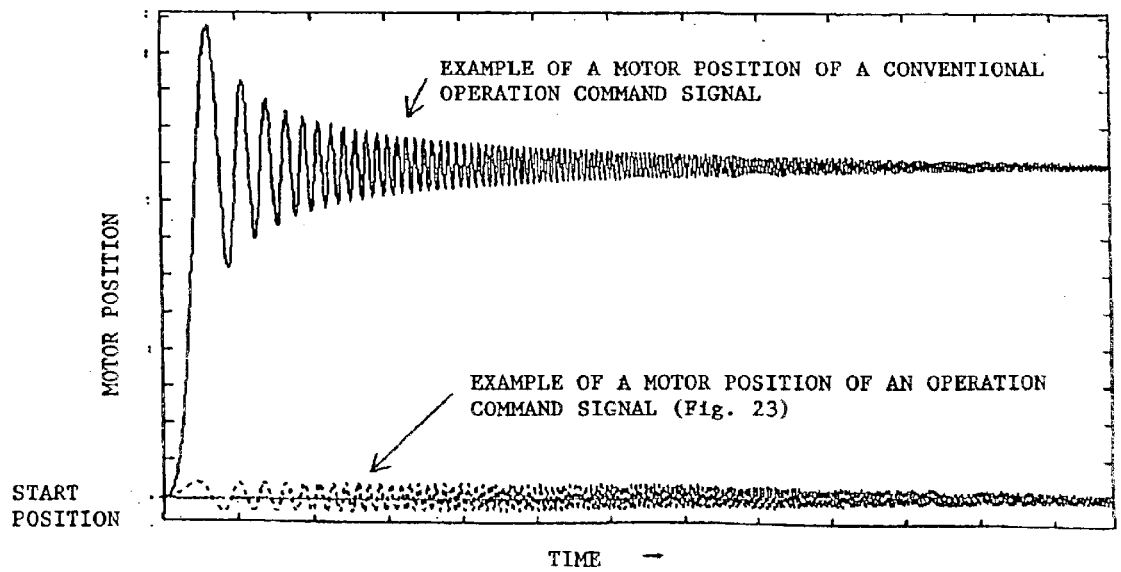
FIG. 24 is a diagram showing positions of an electric motor at the time the frequency characteristics of the electric motor control device according to the modification of the seventh embodiment of the present invention are measured.

In the present modification, a signal produced by differentiating the sweep sine wave whose frequency components are of uniform amplitude as shown in FIG. 23 and scaling the differential such that the average amplitude value is the same as the original sweep sine wave, is used as motion command signal 37. Since this motion command signal 37 greatly reduces changes in the position of the electric motor, making smaller any displacements of movable member 7, as shown in FIG. 24, the frequency characteristics can be measured accurately.

Figure 25:
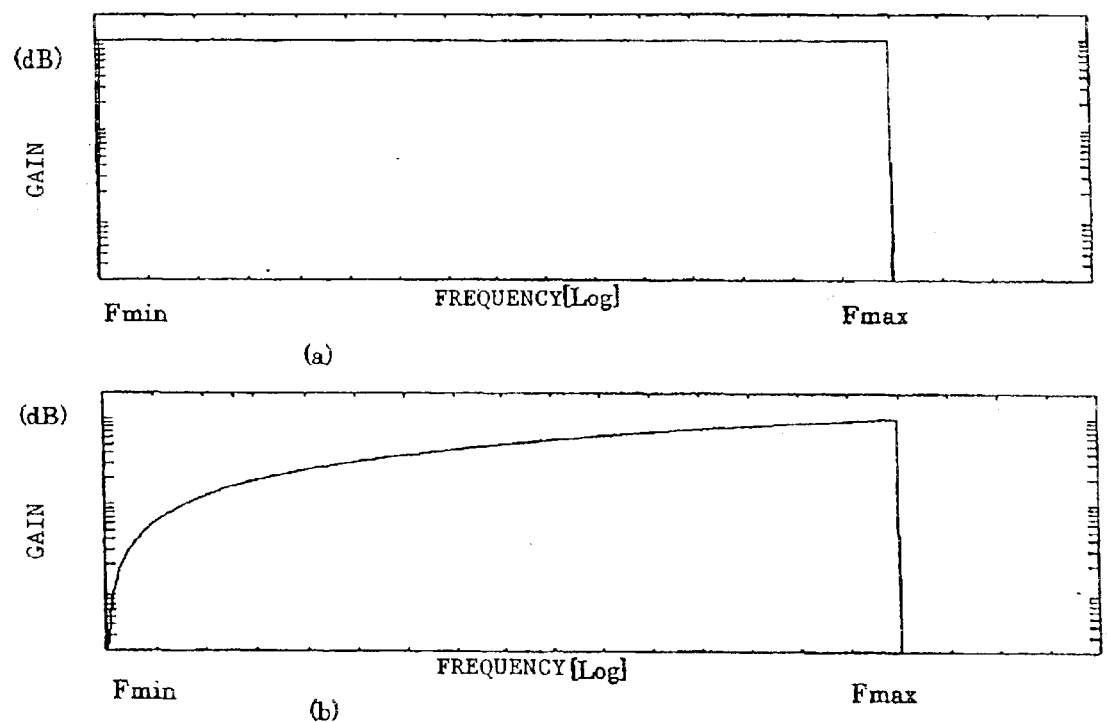
FIG. 25 is a graph showing the results of a frequency analysis of a motion command signal in the electric motor control device according to the modification of the seventh embodiment of the present invention.

In FIG. 25(a), motion command signal 37 has a constant gain from minimum frequency Fmin to maximum frequency Fmax according to the results of the frequency analysis. Motion command signal 37 according to the present modification does not have a constant gain as shown in FIG. 25(b), but is represented by a gradually changing continuous curve. The measured frequency characteristics are shown in FIG. 19. Though the measured frequency characteristics shown in FIG. 19 are slightly different in shape from the frequency characteristics shown in FIG. 18, they have exactly the same anti-resonance and resonance frequencies as those of the frequency characteristics shown in FIG. 18, which serve the purpose of measuring the frequency characteristics.

The sweep sine wave according to the present modification is scaled such that the average amplitude value is the same as the original sweep sine wave. However, the sweep sine wave may be scaled with respect to any desired amplitude as a reference.

The electric motor control device according to the present modification reduces the displacements of movable member 7. However, since movable member 7 has small displacements, the electric motor control device according to the present modification may be combined with the method of controlling the electric motor as described above with reference to FIG. 17.

In the present embodiment, the sweep sine wave is used as motion command signal 37. However, another signal such as a random-wave signal may be used as motion command signal 37.

Figure 26:
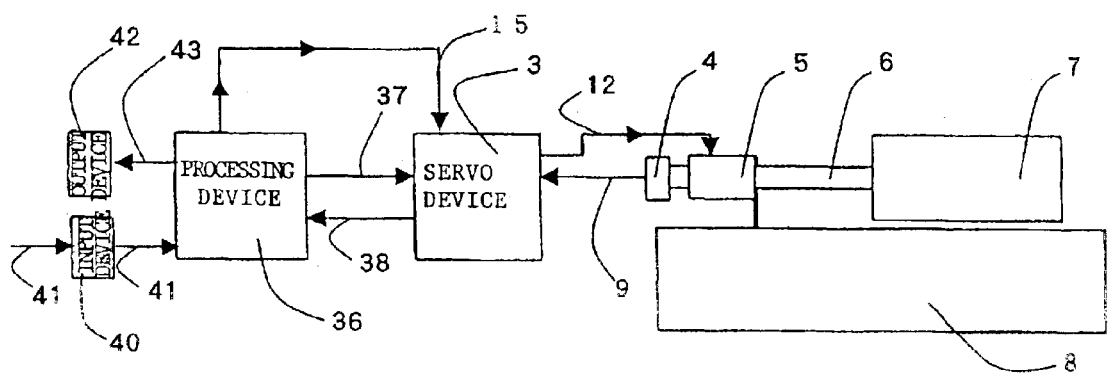
FIG. 26 is a block diagram of an electric motor control device according to an eighth embodiment of the present invention.

FIG. 26 is a block diagram of an electric motor control device according to an eighth embodiment of the present invention.

The electric motor control device according to the eighth embodiment has input device 40 and output device 42 added to the electric motor control device according to the seventh embodiment.

Figure 27:
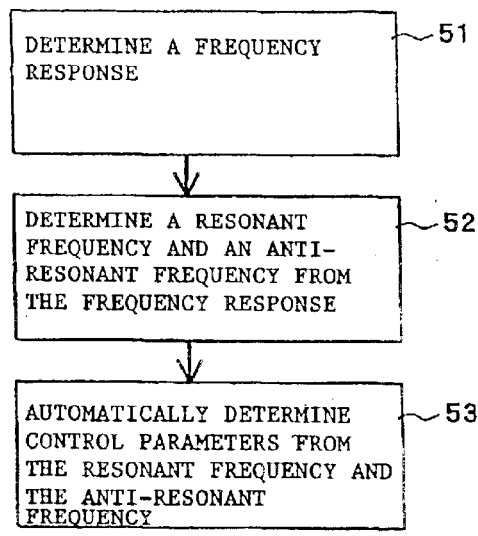
FIG. 27 is a flowchart of an operation sequence of the electric motor control device according to the eighth embodiment of the present invention.
Figure 28:
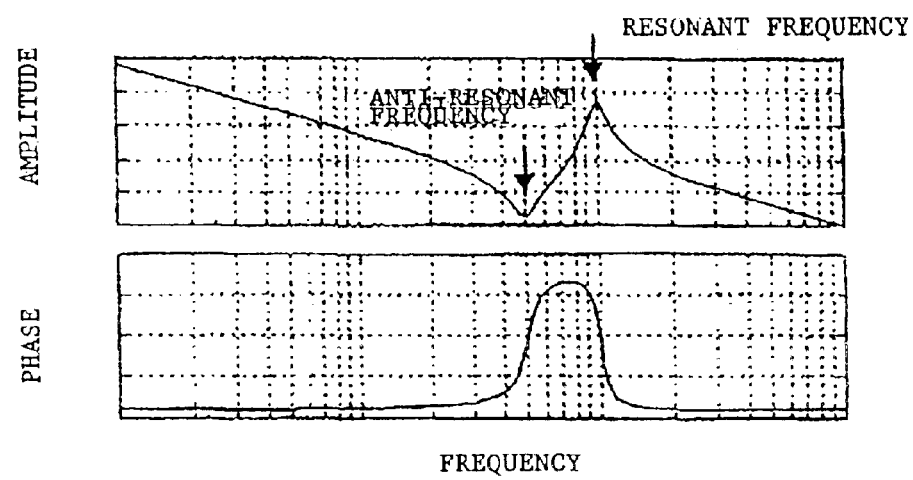
FIG. 28 is a diagram showing the frequency characteristics of the electric motor control device according to the eighth embodiment of the present invention.

Operation of the electric motor control device according to the eighth embodiment will be described below with reference to a flowchart shown in FIG. 27.

In step 51, processing device 36 generates motion command signal 37, and sends control signal 12 equivalent to motion command signal 37 via servo device 3 to electric motor 5. Electric motor 5 is operated, causing transmitting mechanism 6 to move movable member 7, which generates vibrations. Rotation detector 4 detects the rotation and vibrations of electric motor 5, and transmits rotational speed signal 9 through servo device 3 to processing device 36. Processing device 36 analyzes the frequencies of motion command signal 37 and rotation detector signal 38, and determines a frequency response function.

In step 52, since the frequency response function has its amplitude represented by an upward peak and a downward peak, processing device 36 determines a resonance frequency and an anti-resonance frequency according to a complex spectrum interpolating method or a smoothing differentiating method, e.g., a known peak detecting method described in "Waveform data processing for scientific instrumentation" written by Shigeo Minami, published by CQ Publishing (1986). A desired response frequency is input as input information 41 to input device 40, and processing device 36 calculates servo operation command 15.

In step 53, servo operation command 15 calculated by processing device 36 is automatically given to servo device 3, which performs an optimum electric motor control process, whereupon the adjustments are completed.

In the present embodiment, motion command signal 37 and rotation detector signal 38 are frequency-analyzed to determine a frequency response function. However, another sensor such as a position detector for movable member 7 may be used instead of rotation detector 4.

In the present embodiment, servo operation command determined by processing device 36 is immediately given to servo device 3. However, servo operation command 15 may be output from processing device 36 to output device 42, and subsequently input from input device 40 as input information to processing device 36, thus giving servo operation command 15.

Alternatively, servo operation command 15 determined by processing device 36 may be given to servo device 3 which is connected to another machine which has the arrangement of the present embodiment and which includes transmitting mechanism 6, movable member 7, and immovable member 8 that have the same performance.

The interim data of each of the steps shown in FIG. 27 may be output to output device 42, and subsequently input again to input device 40 to continue the next step.

Alternatively, output device 42 may be replaced with a memory device, and data stored in the memory device may be given to processing device 36 to continue the next step.

Figure 29:
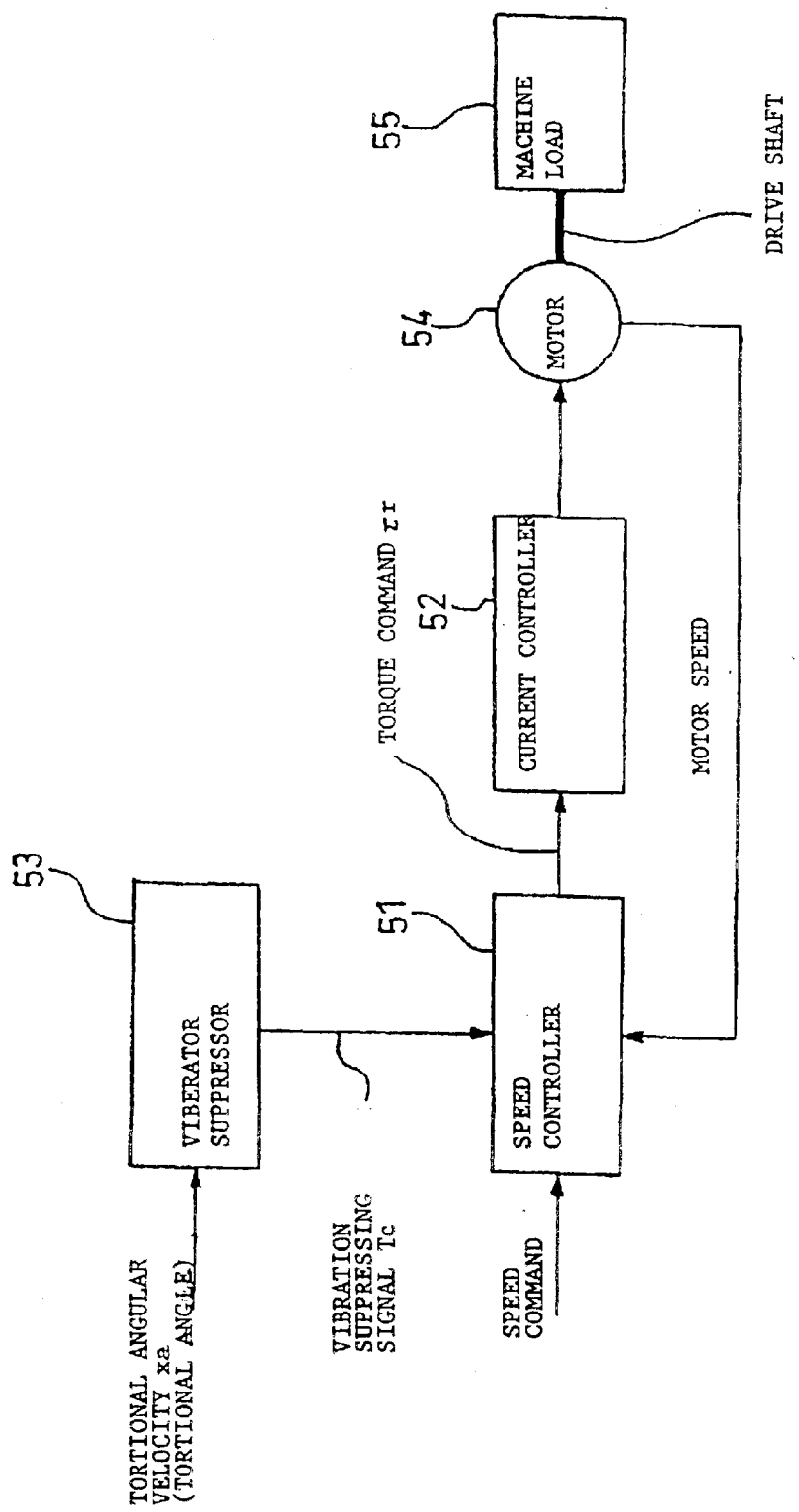
FIG. 29 is a block diagram of an electric motor control device according to a ninth embodiment of the present invention.

FIG. 29 is a block diagram of an electric motor control device according to a ninth embodiment of the present invention.

In FIG. 29, electric motor speed controller 51 is supplied with speed command Vref, electric motor speed Vfb which is output from electric motor 54, and vibration suppressing signal Tc which is output from vibrator suppressor 53, performs an integral plus proportional control (I-P control) process to bring speed command Vref and electric motor speed Vfb into conformity with each other, and outputs torque command τr to current controller 52. Current controller 52 is supplied with torque command τr and energizes electric motor 54. Machine load 55 is coupled to electric motor 54 by a torque transmitting coupling shaft. Vibration suppressor 53 is supplied with a torsional angular velocity which represents the deviation between electric motor speed Vfb and a machine load speed, and outputs vibration suppressing signal Tc.

Electric motor speed controller 51, vibration suppressor 53, electric motor 54, and machine load 55 will be described in detail below with reference to FIG. 30. Subtractor 62 in speed controller 51 subtracts electric motor speed Vfb from speed command Vref to determine a speed deviation. Integrator 63 integrates the speed deviation with time constant Ti. Subtractor 64 subtracts electric motor speed Vfb from the output of integrator 63. Multiplier 65 multiplies the output of subtractor 64 by speed loop gain Kv.

Integrator 67 in vibration suppressor 53 integrates torsional angular velocity xa to determine a torsional angle. Multiplier 68 multiplies the torsional angle by torsional angle gain Ks. Adder 69 adds the output of multiplier 68 and torsional angular velocity xa to each other. Multiplier 70 multiplies the output of adder 69 by torsional angular velocity gain Ksd to determine vibration suppressing signal Tc. Subtractor 66 subtracts the output of multiplier 70 from the output of multiplier 65. Multiplier 71 multiplies the output of subtractor 66 by moment of inertia J1 of the electric motor to determine torque command τr. In FIG. 30, the reference numeral 57 represents a 2-inertia system vibration model which is well known in the art, J1 the moment of inertia of the electric motor, J2 the moment of inertia of the machine load, K the torsional rigidity value of the machine load, xa the torsional angular velocity, and 1/s an integrating process.

A process of tuning time constant Ti and speed loop gain Kv of speed controller 51, and torsional angular velocity gain Ksd and torsional angle gain KS of vibration suppressor 53 in the 2-inertia system shown in FIG. 30 will be described below.

It is assumed that the anti-resonance frequency, the resonance frequency, and moment of inertias J1, J2 of the electric motor and the machine load are known. Speed loop gain KV, time constant Ti of the I-P control system and torsional angle gain Ks and torsional angular velocity gain Ksd of the vibration suppressing system are expressed as follows:

$$Kv = K2$$

$$1/Ti = K1/K2$$

$$Ksd = K4$$

$$Ks = K3/K4 \quad (4)$$

When speed command Vref and torsional angular velocity xa are given, the I-P controller and the vibration suppressor produce an output expressed by the following equation:

$$\frac{1}{J1}\tau r = \left(\frac{1}{s}\frac{K1}{K2}(Vref - Vfb) - Vfb\right)K2 - \left(\frac{1}{s}\frac{K3}{K4} + 1\right)K4xa \quad (5)$$

$$= \frac{1}{s}K1Vref - \left(\frac{1}{s}K1 + K2\right)Vfb - \left(\frac{1}{s}K3 + K4\right)xa$$

where s represents the Laplace operator and 1/s an integrating process.

Figure 30:
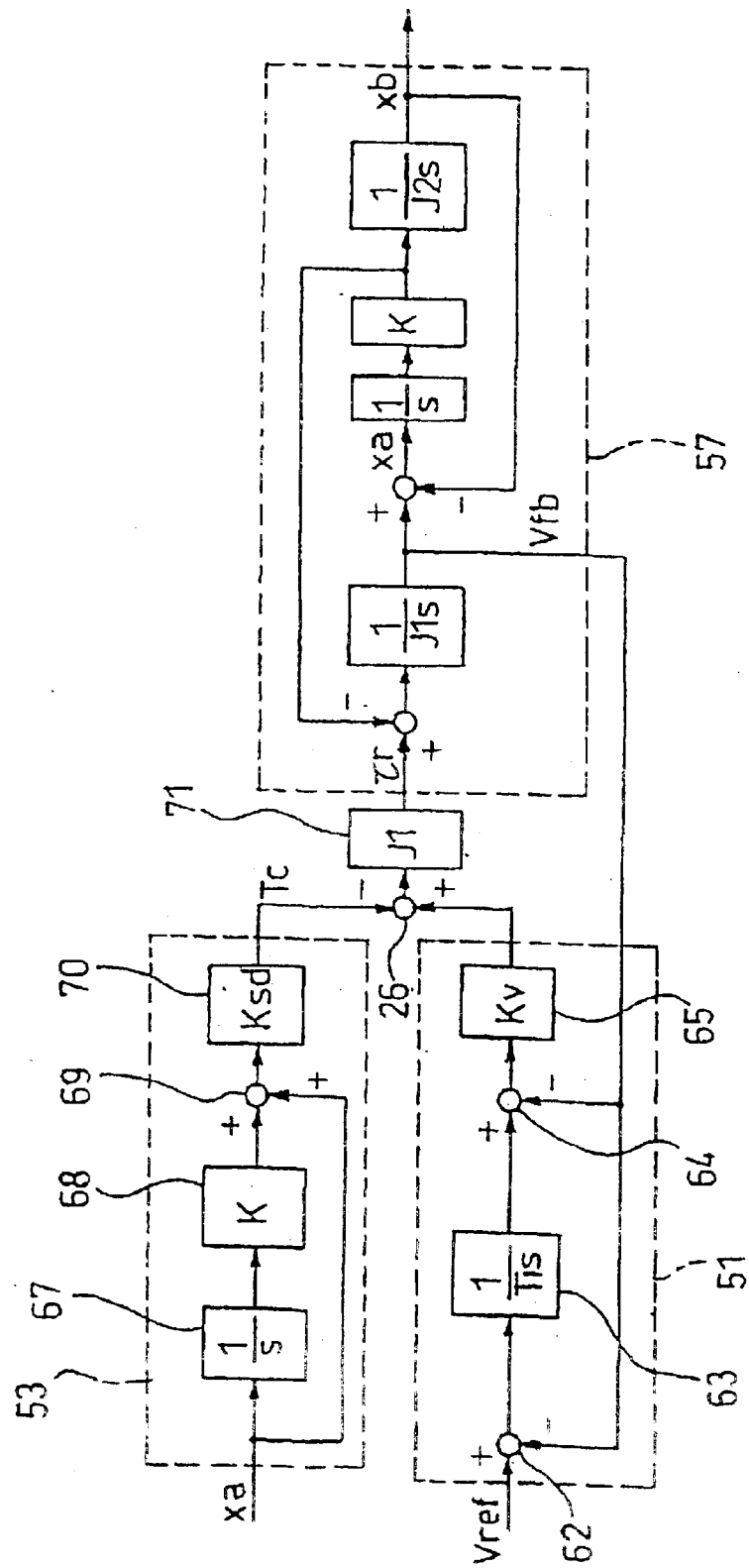
FIG. 30 is a block diagram showing a process of tuning a 2-inertia system of the electric motor control device shown in FIG. 29.

From the block diagram of the controlled object shown in FIG. 30, the following equations (6), (7) are obtained:

$$\dot{xb} = s^2 xb = \frac{K}{J2}xa \quad (6)$$

$$\ddot{xa} = s^2 xa = s^2(Vfb - xb) = s\frac{\tau r}{J1} - \left(\frac{1}{J1} + \frac{1}{J2}\right)Kxa \quad (7)$$

where s2 represents a differential of second order.
a, b are expressed by the following equation s (8):

$$a = \frac{K}{J2}, \ b = \left(\frac{1}{J1} + \frac{1}{J2}\right)K \quad (8)$$

Using a, b, the equation s (6), (7) are rewritten into the following equations (9), (10):

$$s^2 xb = axa \quad (9)$$

$$s^2 xa = s^2(Vfb - xb) = s\frac{\tau r}{J1} - bxa \quad (10)$$

By substituting the equation (5) in the equation (10), the following equation (11) is obtained:

$$s^2 xa = s\left[\frac{1}{s}K1Vref - \left(\frac{1}{s}K1 + K2\right)Vfb - \left(\frac{1}{s}K3 + K4\right)xa\right] - bxa \quad (11)$$

Since Vfb=xa+xb, the equation (11) becomes the equation (12):

$$(s^2 + b)xa = k1Vref - s\left(\frac{1}{s}K1 + K2\right)(xa + xb) - s\left(\frac{1}{s}K3 + K4\right)xa \quad (12)$$

The equation (10) is rewritten into the following equation (13):

$$xa = s^2 \frac{1}{a} xb \quad (13)$$

By substituting the equation (13) in the equation (12) and expanding the resultant equation, the following equation (14) is obtained:

$$(s^2 + b)s^2 \frac{1}{a} xb = \quad (14)$$

$$K1Vref - \left(s^2\frac{K1}{a} + s^3\frac{K2}{a} + K1 + sK2 + s^2\frac{K3}{a} + s^3\frac{K4}{a}\right)xb$$

The equation (14) is transposed and organized into the equation (15).

$$K1Vref = \left(\frac{1}{a}s^4 + \frac{1}{a}(K2 + K4)s^3 + \frac{1}{a}(b + K1 + K3)s^2 + K2s + K1\right)xb \quad (15)$$

A characteristic equation is determined from the equation (15) as indicated by the following equation (16):

$$aK1\frac{Vref}{xb} = s^4 + (K2 + K4)s^3 + (b + K1 + K3)s^2 + aK2s + aK1 = F(s) \quad (16)$$

Since F(S) is a quartic equation, a characteristic equation with a quadruple root s=−ω, and ω>0 is considered in order to satisfy stable conditions, where ω represents a target response frequency.

$$G(s)=(s^2+\xi_1\omega s+\omega^2)(s^2+\xi_2\omega s+\omega^2) \quad (17)$$

If $\xi_1=\xi_2=2$, then the following characteristic equation (18) is derived:

$$G(s)=s^4+4\omega s^3+6\omega^2 s^2+4\omega^3 s+\omega^4 \quad (18)$$

The equation (16) becomes the following equation (19):

$$F(s^4+(K2+K4)s^3+(b+K1+K3)s^2+aK2s+aK1 \quad (19)$$

By comparing the coefficients of the terms (s0 term, s1 term, s2 term, s3 term) of the equations (16), (19), the coefficients are determined as indicated by the following equations (20):

$$\text{From } s0 \text{ term, } K1 = \frac{\omega^4}{a}$$

$$\text{From } s1 \text{ term, } K2 = \frac{4\omega^3}{a}$$

$$\text{From } s2 \text{ term, } K3 = -\frac{\omega^4}{a}+6\omega^2-b$$

$$\text{From } s3 \text{ term } K4 = 4\omega - \frac{4\omega^3}{a}$$

(20)

From the equation (4'), the gains of the I-P controller 51 and the vibration suppressor 53 are represented by the equation (1).

The results of a simulation of the speed control system which is tuned by the present invention are shown below. The parameters of the machine load and the electric motor were set with respect to anti-resonance frequency WL of 50 [Hz] and resonance frequency WH of 70 [Hz] as follows: electric motor moment of inertia J1 of 0.5102 [Kgm2], machine load moment of inertia J2 of 0.4898 [Kgm2], machine load torsional rigidity value K of 4.8341e+4 [Kgm2/s2]. Target response frequency ω was set to 60 [Hz], and time constant Ti, speed loop gain Kv, torsional angle gain Ks, and torsional angular velocity gain Ksd were tuned based on the equation (18).

Figure 31:
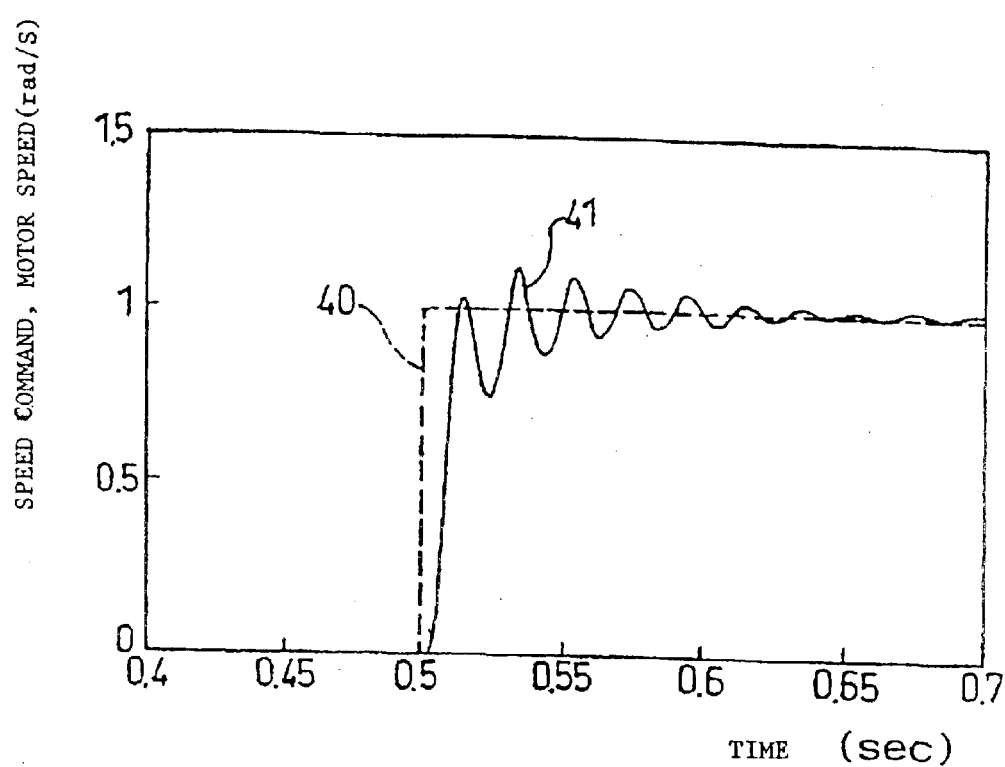
FIG. 31 is a diagram showing a response waveform produced in response to a step input applied to the electric motor control device shown in FIG. 29 when a vibration suppressor is not in operation.
Figure 32:
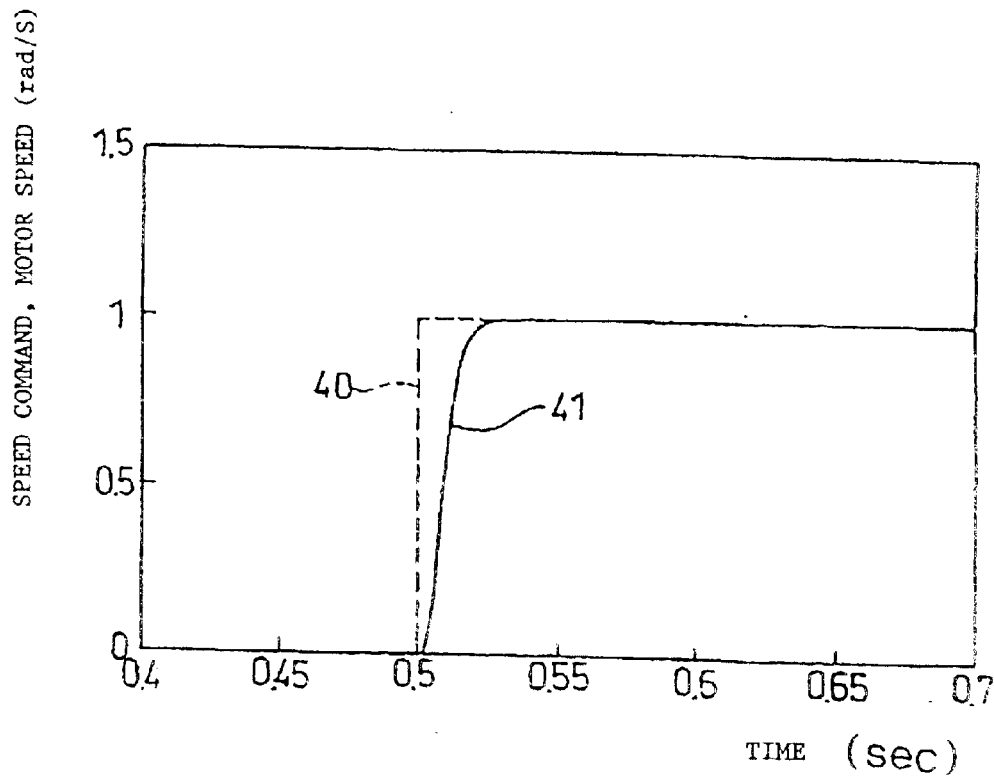
FIG. 32 is a diagram showing a response waveform produced in response to a step input applied to the electric motor control device shown in FIG. 29 when the vibration suppressor is in operation.

The tuned gains were Kv=2171.5 [rad/s], Ksd=−663.5, Ks=−685.2, and Ti=10.6 [ms]. FIGS. 31, 32 show responses at the time a step command is input. In FIGS. 31, 32, curve 40 represents a speed command and curve 41 represents an electric motor speed. Specifically, FIG. 31 shows a response waveform obtained after the tuning when the vibration suppressor is not in operation, and FIG. 32 shows a response waveform obtained when the vibration suppressor is in operation. In FIG. 31, the electric motor speed is vibrated. In FIG. 32, the electric motor speed suffers no overshoot, and indicates an ideal vibration-free response based on a 2-inertia system.

It has been confirmed from the above results that the vibrations can be suppressed by the 2-inertia system, and the parameters (time constant Ti, speed loop gain Kv) of the I-P controllers and the parameters (torsional angle gain Ks, torsional angular velocity gain Ksd) of the vibration suppressor can automatically be set.

According to the present embodiment, if a target response is to be changed, then by changing only target response frequency ω, the speed loop can be adjusted while automatically suppressing vibrations, without having to adjust the vibration suppressor and the speed controller on a trial-and-error basis as with the conventional electric motor control devices.

Figure 33:
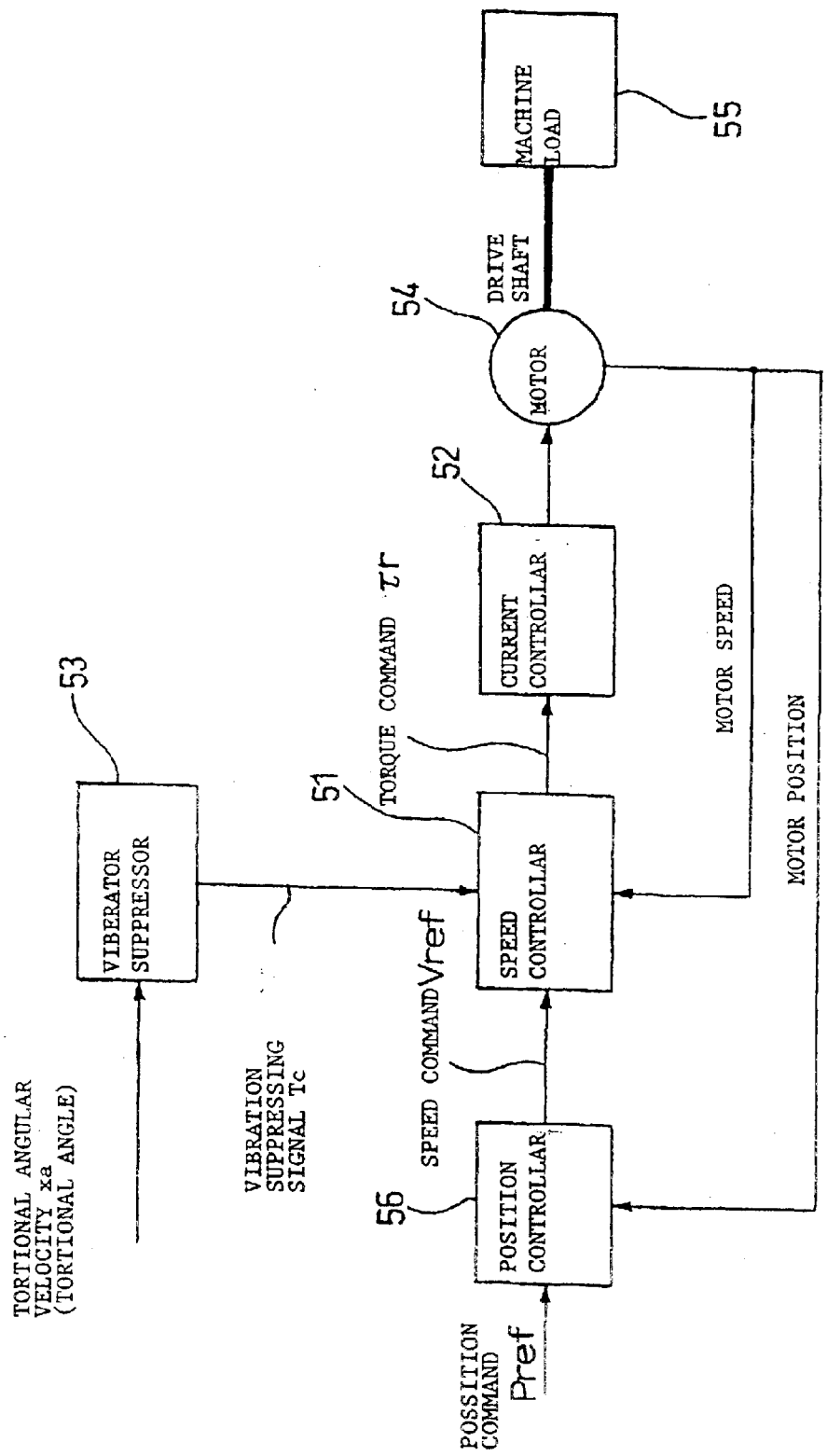
FIG. 33 is a block diagram of an electric motor control device according to a tenth embodiment of the present invention.

FIG. 33 is a block diagram of an electric motor control device according to a tenth embodiment of the present invention.

In FIG. 33, position controller 56 is supplied with a position command and the position of electric motor 54, and outputs a speed command to speed controller 51.

Speed controller 51 is supplied with the speed command, the speed of electric motor 54, and vibration suppressing signal Tc which is output from vibrator suppressor 53, performs a speed control process to bring speed command and electric motor speed into conformity with each other, and outputs torque command τr to current controller 52. Current controller 52 is supplied with torque command τr and energizes electric motor 54. Machine load 55 is coupled to electric motor 54 by a torque transmitting coupling shaft. Vibration suppressor 53 is supplied with the deviation between the speed of electric motor 54 and a machine load speed, and outputs vibration suppressing signal Tc. If the machine load speed cannot be detected, then it may be estimated using a disturbance observer or the like.

Operation of speed controller 51, vibration suppressor 53, electric motor 54, and machine load 55 will be described in detail below with reference to FIG. 34.

Subtractor 62 in speed controller 51 subtracts electric motor speed Vfb from speed command Vref to determine a speed deviation. Integrator 63 integrates the speed deviation with a time constant Ti. Multiplier 74 multiplies the speed command by a coefficient α(0≦α≦1). If α=0, then an I-P control process is performed, and if α=1, then a PI control process is performed. By continuously changing α from 0 to 1, the speed control system can continuously change from the I-P control process to the PI control process. Subtractor 64 adds the output from multiplier 74 and the output from integrator 63 and subtracts electric motor speed Vfb from the sum. Multiplier 65 multiplies the output of subtractor 64 by speed loop gain Kv.

Integrator 67 in vibration suppressor 53 integrates torsional angular velocity xa to determine a torsional angle. Multiplier 68 multiplies the torsional angle by torsional angle gain KS.

Adder 69 adds the output of multiplier 68 and torsional angular velocity xa to each other. Multiplier 70 multiplies the output of adder 69 by torsional angular velocity gain Ksd to determine vibration suppressing signal Tc.

Subtractor 66 subtracts the output of multiplier 70 from the output of multiplier 65.

Multiplier 71 multiplies the output of subtractor 66 by moment of inertia J1 of the electric motor to determine torque command τr. In the illustrated embodiment, the torsional angular velocity which is input to vibration suppressor 53 is integrated by integrator 67 to determine a torsional angle. However, if the electric motor position and the load position are known, then a vibration suppressor may be arranged with the torsional angle input thereto.

Figure 34:
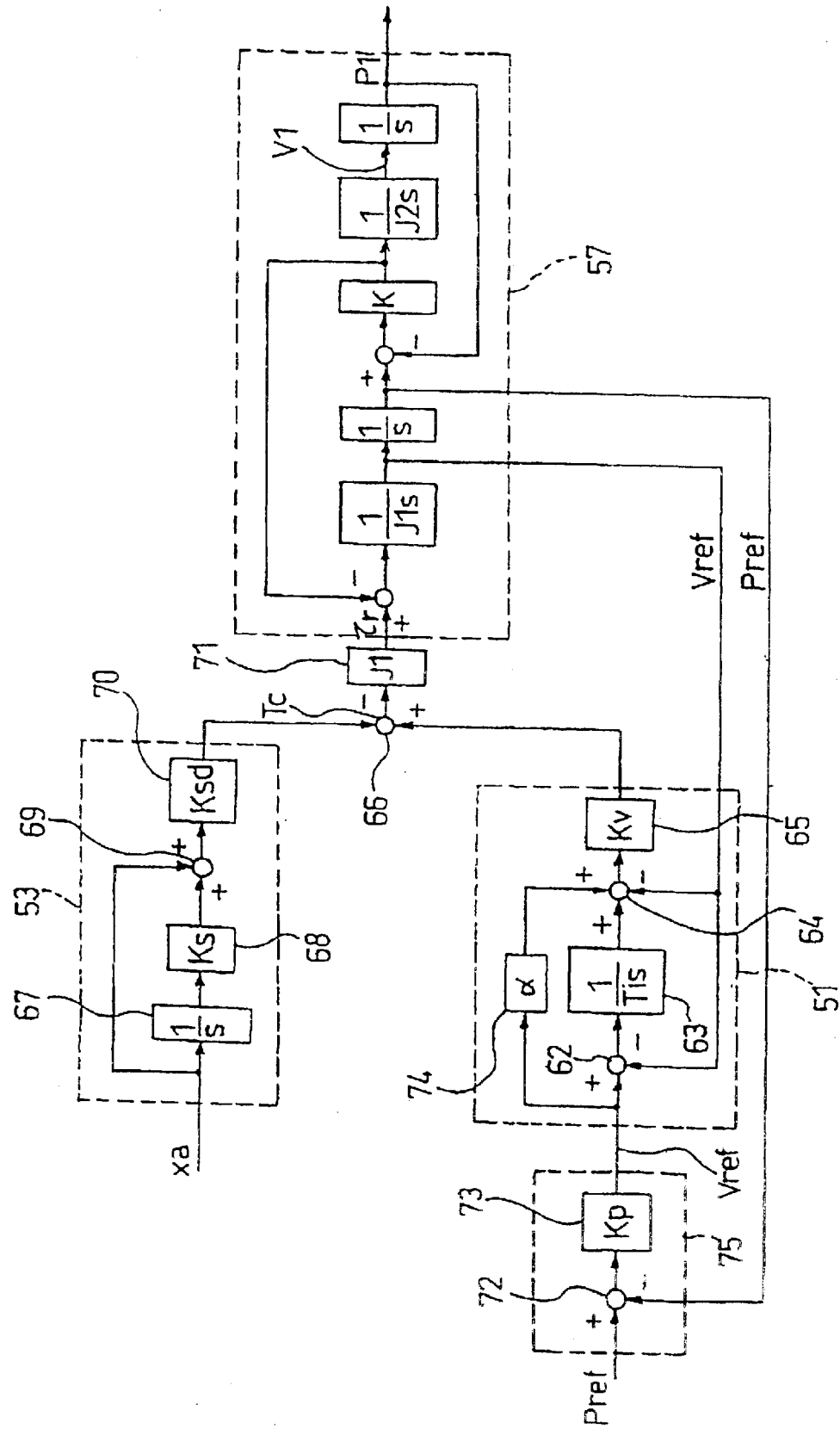
FIG. 34 is a block diagram showing a process of tuning a 2-inertia system of the electric motor control device shown in FIG. 33.

In FIG. 34, the reference numeral 17 represents a 2-inertia system vibration model which is well known in the art, J1 the moment of inertia of the electric motor, J2 the moment of inertia of the machine load, K the torsional rigidity value of the machine load, xa the torsional angular velocity determined from the deviation between the electric motor speed and the machine load speed, and 1/s an integrating process.

A process of tuning speed loop integral time constant Ti and speed loop gain Kv of speed controller 51, and torsional angular velocity gain Ksd and torsional angle gain KS of vibration suppressor 53 in the 2-inertia system shown in FIG. 34 will be described below. It is assumed that the anti-resonance frequency, the resonance frequency, and moment of inertias J1, J2 of the electric motor and the machine load are known. As with the first embodiment, speed loop gain KV, speed loop integral time constant Ti, and torsional angle gain Ks and torsional angular velocity gain Ksd of the vibration suppressing system are expressed as follows:

$Kv=K2$ $1/Ti=K1/K2$ $Ksd=K4$ $Ks=K3/K4$ (20')

When speed command Vref and torsional angular velocity xa are given, the I-P controller and the vibration suppressor produce an output expressed by the following equation (21):

$$\frac{1}{J1}\tau r = \left(\frac{1}{s}\frac{K1}{K2}(Vref - Vfb) - Vfb + \alpha K2\right)K2 - \left(\frac{1}{s}\frac{K3}{K4} + 1\right)K4xa \quad (21)$$

$$= \left(\frac{1}{s}K1 + \alpha K2\right)Vref - \left(\frac{1}{s}K1 + K2\right)Vfb - \left(\frac{1}{s}K3 + K4\right)xa$$

where s represents the Laplace operator and 1/s an integrating process.

From the block diagram of the controlled object shown in FIG. 34, the following equations (22), (23) are obtained:

$$\ddot{V}l = s^2 Vl = \frac{K}{J2}xa \quad (22)$$

$$x\ddot{a} = s^2 xa = s^2(Vfb - Vl) = s\frac{\tau r}{J1} - \left(\frac{1}{J1} + \frac{1}{J2}\right)Kxa \quad (23)$$

where Vl represents a machine load speed, xa a torsional angular velocity, and s2 a differential of second order.

a, b are expressed by the following equations (24):

$$a = \frac{K}{J2}, b = \left(\frac{1}{J1} + \frac{1}{J2}\right)K \quad (24)$$

Using a, b, the equations (22), (23) are rewritten into the following equations (25), (26):

$s^2xb=axa$ (25)

$$s^2xa = s^2(Vfb - Vl) = s\frac{\tau r}{J1} - bxa \quad (26)$$

By substituting the equation (21) in the equation (26), the following equation (27) is obtained:

$s^2xa = $ (27)

$$s\left[\left(\frac{1}{s}K1 + \alpha K2\right)Vref - \left(\frac{1}{2}K1 + K2\right)Vfb - \left(\frac{1}{s}K3 + K4\right)xa\right] - bxa$$

Because Vfb=xa +Vl, the equation (27) can be changed to the equation (28):

$(s^2=b)xa=(k1+\alpha K2s)Vref-s(1/sK1+K2)(xa+V)-s(1/sK3+K4)xa$ (28)

The equation (25) is changed to the equation (29):

$xa=s^2 1/aVl$ (29)

By substituting the equation (29) in the equation (28) and expanding the resultant equation, the following equation (30) is obtained:

$$(s^2 + b)s^3\frac{1}{a}Vl = \quad (30)$$

$$(K1 + \alpha K2s)Vref - \left(s^2\frac{K1}{a} + s^3\frac{K2}{a} + K1 + sK2 + s^2\frac{K3}{a} + s^3\frac{K4}{a}\right)Vl$$

The equation (30) is transposed and organized into the equation (31).

$(K1+\alpha K2s)Vref=(1/as^4+1/a(K2+K4)s^3+1/a(b+K1+K3)s^2+K2s+K1)Vl$ (31)

A characteristic equation of a transfer function from the speed command to the electric motor speed is determined from the equation (31) as indicated by the following equation (32):

$$(s^2 + a)(\alpha K2s + K1)\frac{Vref}{Vm} = \quad (32)$$

$$s^4 + (K2 + K4)s^2 + (b + K1 + K3)s^2 + aK2s + aK1 = F(a)$$

Since F(s) is a quartic equation, a characteristic equation with a quadruple root s=−ω, and ω>0 is considered in order to satisfy stable conditions, where ω represents a target response frequency and ξ1, ξ2 damping constants.

$G(s)=(s^2+2\xi_1\omega s+\omega^2)(s^2+2\xi_2\omega s+\omega^2)$ (33)

If ξ1=ξ2=ξ, then the following characteristic equation (34) is derived:

$G(s)=s^4+4\xi\omega s^3+(4\xi^2+2)\omega^2 s^2+4\xi\omega^3 s+\omega^4$ (34)

Thus, the equation (32) becomes the following equation (35):

$F(s)=s^4+(K2+K4)s^2+(b+K1+K3)s^2+aK2s+aK1$ (35)

By comparing the coefficients of the terms (s0 term, s1 term, s2 term, s3 term) of the equations (32), (34), the coefficients are determined as indicated by the following equations (36):

From s0 term, $K1 = \dfrac{\omega^4}{a}$ (36)

From s1 term, $K2 = \dfrac{4\xi\omega^3}{a}$

From s2 term, $K3 = -\dfrac{\omega^4}{a} + (4\xi^2 + 2)\omega^2 - b$

From s3 term, $K4 = \left(4\omega - \dfrac{4\omega^3}{a}\right)\xi$

From the equation (20'), the gains of I-P controller 51 and vibration suppressor 53 are represented by the equation (37):

$$Kv = \frac{4\xi\omega^3 J2}{K}, \frac{1}{Ti} = \frac{\omega}{4\xi}, Ksd = \left(4\omega - \frac{4\omega^3 J2}{K}\right)\xi, \quad (37)$$

-continued $$Ks = \frac{-J2\omega^4 + (4\zeta^2 + 2)K\omega^2 - K^2\left(\frac{1}{J1} + \frac{1}{J2}\right)}{(4K\omega - 4J2\omega^3)\zeta}$$

where ξ represents the damping coefficient (ξ>0),
ω represents the target response frequency for speed control,
J1 represents the moment of inertia of the electric motor in the 2-inertia system,
J2 represents the moment of inertia of the machine load, and
K represents the torsional rigidity value.

A position control process will be described below.

Position controller 56 is supplied with a position command, and outputs a speed command to speed controller 51.

Subtractor 72 in position controller 56 subtracts electric motor position Pfb from position command Pref to determine a positional deviation. Multiplier 73 multiplies the positional deviation by position loop gain Kp. The parameters of speed controller 51 use numerical values determined by the following equations (38):

$$Kv = \frac{4\zeta\omega^3 J2}{K}, \ \frac{1}{Ti} = \frac{\omega}{4\zeta}, \ Ksd = \left(4\omega - \frac{4\omega^3 J2}{K}\right)\zeta, \tag{38}$$

$$Ks = \frac{-J2\omega^4 + (4\zeta^2 + 2)K\omega^2 - K^2\left(\frac{1}{J1} + \frac{1}{J2}\right)}{(4K\omega - 4J2\omega^3)\zeta}$$

where ξ represents the damping coefficient (ξ>0),
ω represents the target response frequency for speed control,
J1 represents the moment of inertia of the motor in the 2-inertia system,
J2 represents the moment of inertia of the machine load, and K represents the torsional rigidity value.

The position loop gain Kp in position controller 56 is a function of the target response frequency ω of speed controller 51, and is expressed by the following equation (39):

$$Kp = \omega/\beta \tag{39}$$

where β represents a natural number.

The results of a simulation of the speed control system and the position control system which are tuned by the tenth embodiment are shown below.

The parameters of the machine load and the electric motor were set on the basis of anti-resonance frequency WL of 50 [Hz] and resonance frequency WH of 70 [Hz] as follows: electric motor moment of inertia J1 of 0.5102 (Kgm2], machine load moment of inertia J2 of 0.4898 [Kgm2], machine load torsional rigidity value K of 4.8341e+4 [Kgm2/s2].

Target response frequency ω was set to 60 [Hz], and speed loop integral time constant Ti, speed loop gain Kv, torsional angle gain Ks, and torsional angular velocity gain Ksd were tuned based on the equation (36).

The tuned gains were Kv=2171.5 [rad/s], Ksd=−663.5, Ks=−685.2, and Ti=10.6 [ms]. The position loop gain Kp of position controller 16 was ω/4.

Figure 35:
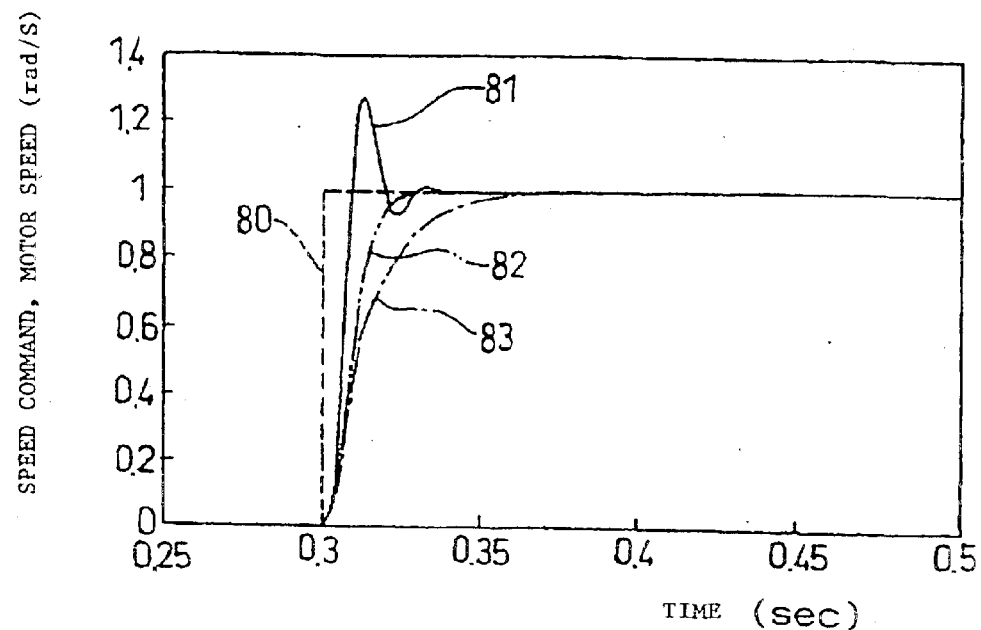
FIG. 35 is a diagram showing a response waveform of a speed control system (I-P controller) of the electric motor control device shown in FIG. 33 when a vibration suppressor is in operation.
Figure 36:
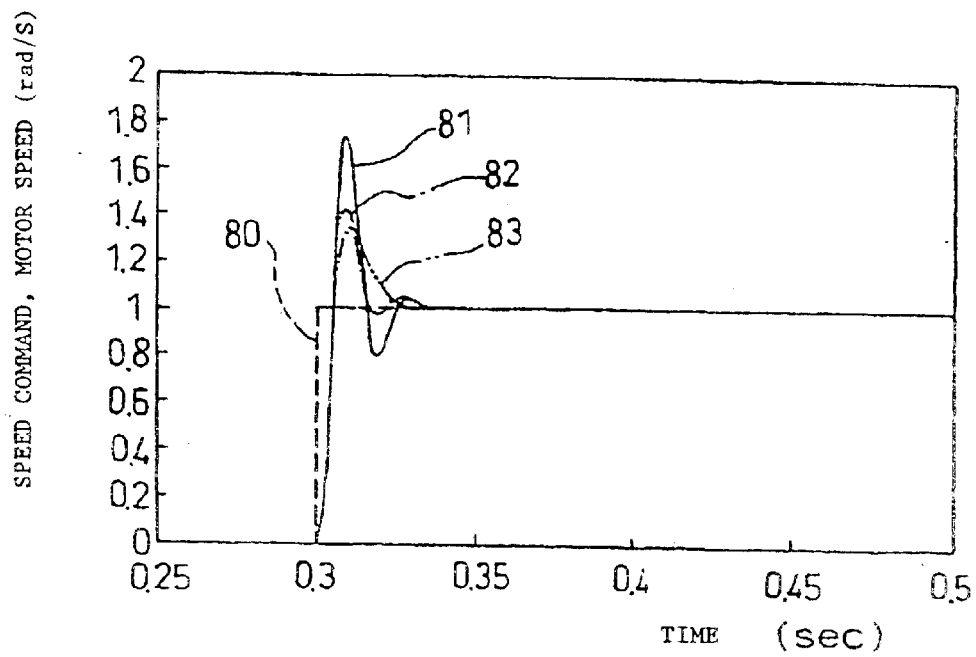
FIG. 36 is a diagram showing a response waveform of a speed control system (PI controller) of the electric motor control device shown in FIG. 33 when the vibration suppressor is in operation.
Figure 37:
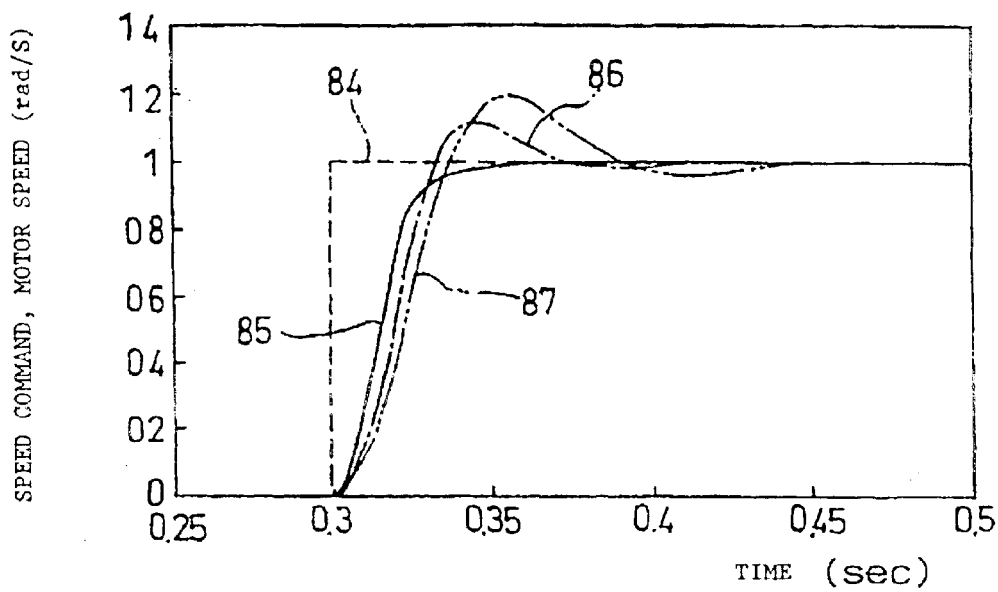
FIG. 37 is a diagram showing a response waveform of a position control system (I-P controller) of the electric motor control device shown in FIG. 33 when the vibration suppressor is in operation.
Figure 38:
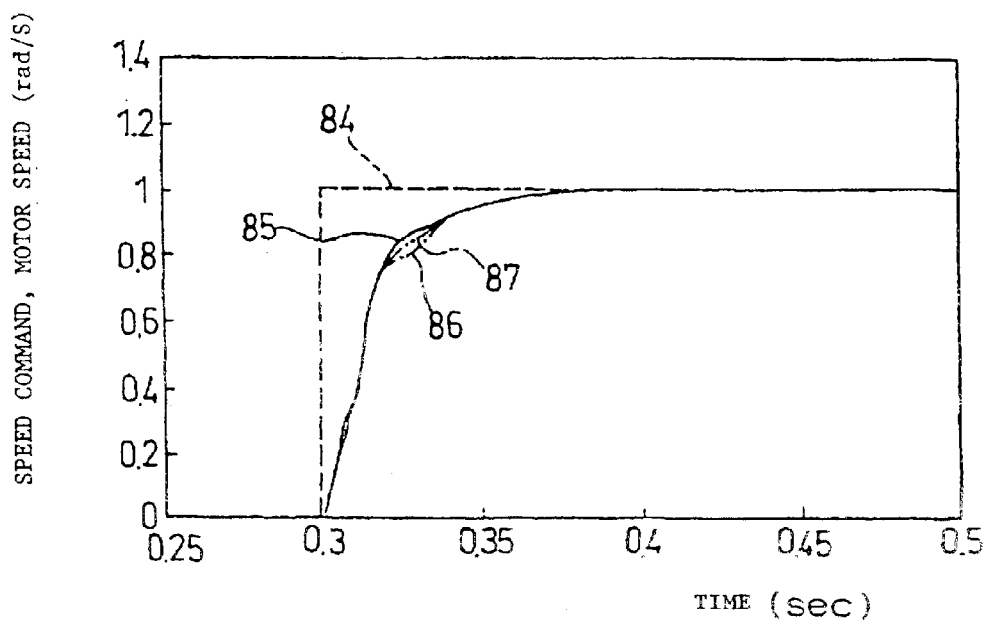
FIG. 38 is a diagram showing a response waveform of a position control system (PI controller) of the electric motor control device shown in FIG. 33 when the vibration suppressor is in operation.

With ξ=0.5, 1, 1.5, FIGS. 35, 36 show step responses obtained at the time the speed control process is carried out, and FIGS. 37, 38 show step responses obtained at the time the position control process is carried out. In FIGS. 35, 37, the speed controller performed the I-P control process (α=0). In FIGS. 36, 38, the speed controller performed the PI control process (α=1). Vibrations of the 2-inertia system were suppressed in all cases. Based on a comparison between the values of ξ, response curve 42 for ξ=1 has a shorter settling time than response curves 41, 43 for ξ=0.5, 1.5 in FIG. 35, response curve 43 for ξ=1.5 has a shorter settling time than response curves 41, 42 for ξ=0.5, 1 in FIG. 36, response curve 45 for ξ=0.5 has a shorter settling time than response curves 46, 47 for ξ=1, 1.5 in FIG. 37, and response curve 45 for ξ=0.5 has a shorter settling time than response curves 46, 47 for ξ=1, 1.5 in FIG. 38.

It can be seen from the above results that the vibrations can be suppressed by the 2-inertia system, and the parameters (speed loop integral time constant Ti, speed loop gain Kv) of the speed controller and the parameters (torsional angle gain Ks, torsional angular velocity gain Ksd) of the vibration suppressor can automatically be set, with the speed control system and the position control system being applicable to the PI control process and the I-P control process. The settling time can be shortened by changing ξ in association with parameter α.

According to the tenth embodiment, if a target response is to be changed, then by changing target response frequency ω, the speed controller and the position controller can be adjusted while automatically suppressing vibrations. Therefore, the vibration suppressor, the speed controller, and the position controller do not need to be adjusted on a trial-and-error basis. Furthermore, when the arrangement of the speed controller is changed from the I-P control process to the PI control process using parameter α, the settling time can be shortened by changing ξ in association with parameter α.

Figure 39:
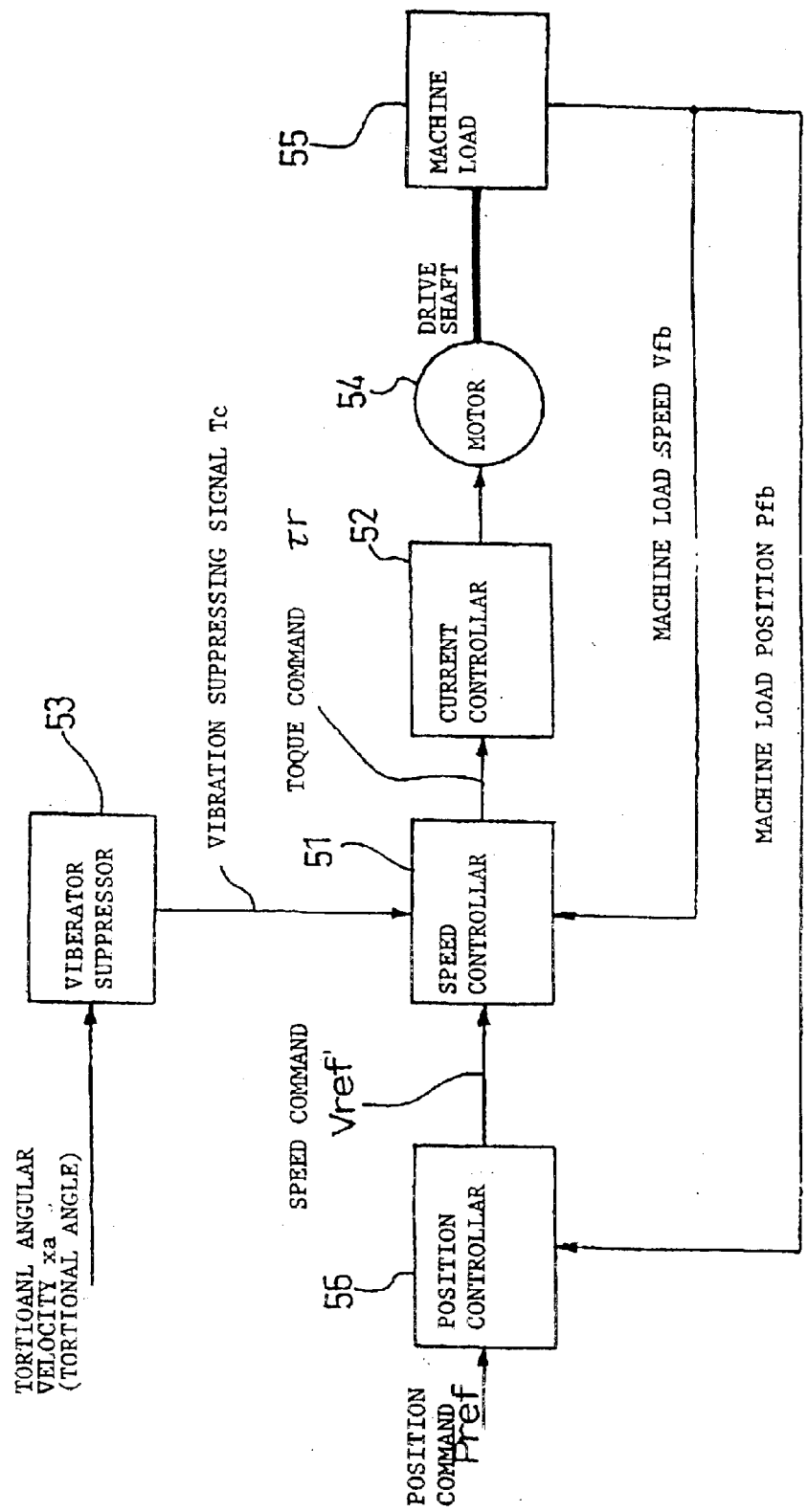
FIG. 39 is a block diagram of an electric motor control device according to an eleventh embodiment of the present invention.

FIG. 39 is a block diagram of an electric motor control device according to an eleventh embodiment of the present invention.

In FIG. 39, position controller 56 is supplied with machine load position Pfb and position command Pref, and outputs speed command Vref to speed controller 51 to bring machine load position Pfb and position command Pref into conformity with each other.

Speed controller 51 is supplied with speed command Vref, machine load speed Vfb, and vibration suppressing signal Tc, performs a speed control process for bringing speed command Vref and machine load speed Vfb into conformity with each other, and outputs torque command τr to current controller 52. Current controller 52 is supplied with torque command τr and outputs a current command to energize electric motor 54. Electric motor 54 is coupled to machine load 55 by a torque transmitting coupling shaft. Vibration suppressor 53 is supplied with torsional angular velocity xa which represents the deviation between the speed of electric motor 54 and machine load speed Vfb, and outputs vibration suppressing signal Tc.

If the machine load speed cannot be detected, then it may be estimated using a disturbance observer or the like.

Speed controller 51, vibration suppressor 53, electric motor 54, and machine load 55 will be described in detail below with reference to FIG. 40. Subtractor 62 in speed controller 51 subtracts machine load speed vfb from speed command vref to determine a speed deviation. Integrator 63 integrates the speed deviation with time constant Ti. As with the tenth embodiment, coefficient 34 is a parameter for assigning the PI control process and the I-P control process as desired, and multiplies speed command Vref. Subtractor 64 adds the output from multiplier 74 and the output from integrator 63 and subtracts machine load speed Vfb from the sum. Multiplier 65 multiplies the output of subtractor 64 by speed loop gain Kv.

Integrator 67 in vibration suppressor 53 integrates torsional angular velocity xa which is determined from the deviation between electric motor speed vm and machine load speed Vfb to determine a torsional angle. Multiplier 68 multiplies the torsional angle by torsional angle gain Ks. Adder 69 adds the output of multiplier 68 and torsional angular velocity xa to each other. Multiplier 70 multiplies the output of adder 69 by torsional angular velocity gain Ksd to determine vibration suppressing signal Tc. Subtractor 66 subtracts the output of multiplier 70 from the output of multiplier 65. Multiplier 71 multiplies the output of subtractor 66 by moment of inertia J1 of the electric motor to determine torque command $\xi$r. In the illustrated embodiment, the torsional angular velocity xa is integrated by integrator 67 to determine a torsional angle. However, if the electric motor position and the load position are known, then a vibration suppressor may be arranged with the torsional angle input to vibration suppressor 53.

Figure 40:
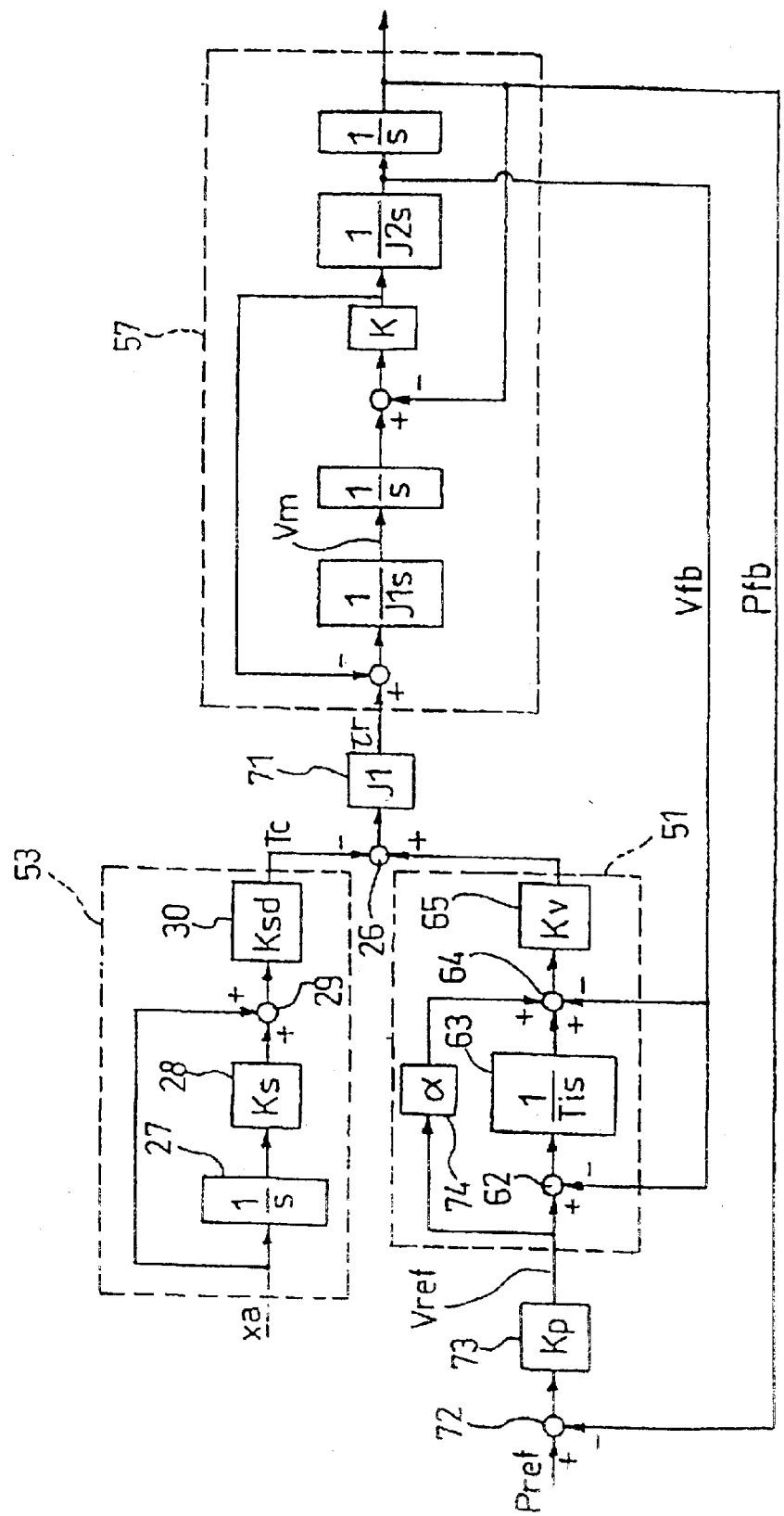
FIG. 40 is a block diagram showing a process of tuning a 2-inertia system of the electric motor control device shown in FIG. 39.

In FIG. 40, the reference numeral 57 represents a 2-inertia system vibration model, J1 the moment of inertia of the electric motor, J2 the moment of inertia of the machine load, K the torsional rigidity value of the machine load, xa the torsional angular velocity determined from the deviation between the electric motor speed and the machine load speed, and 1/s an integrating process.

In a semi-closed feedback control system according to the tenth embodiment, the feedback signals used represent electric motor speed vfb and electric motor position Pfb. In a fully closed feedback control system according to the eleventh embodiment, the feedback signals used represent machine load speed Vfb and machine load position Pfb. Though these parameters are strictly of different numerical values in actual equations, they are indicated by identical symbols because they are not reflected in final results in general equations.

A process of tuning time constant Ti, speed loop gain Kv, torsional angular velocity gain Ksd, and torsional angle gain Ks will be described below. It is assumed that the anti-resonance frequency, the resonance frequency, and moment of inertias J1, J2 of the electric motor and the machine load are known.

Speed loop gain Kv, time constant Ti of the I-P control system and torsional angle gain Ks and torsional angular velocity gain Ksd of the vibration suppressing system are expressed as follows:

$$Kv = K2$$

$$1/Ti = K1/K2$$

$$Ksd = K4$$

$$Ks = K3/K4 \quad (40)$$

When speed command Vref and torsional angular velocity xa are given, the multiplier 71 produces an output expressed by the following equation (41):

$$\frac{1}{J1}\tau_r = \left(\frac{1}{s}\frac{K1}{K2}(Vref - Vfb) - Vfb + \alpha Vref\right)K2 - \quad (41)$$

$$\left(\frac{1}{s}\frac{K3}{K4} + 1\right)K4xa$$

$$= \left(\frac{1}{s}K1 + \alpha K2\right)Vref - \left(\frac{1}{s}K1 + K2\right)Vfb -$$

-continued $$\left(\frac{1}{s}K3 + K4\right)xa$$

where s represents the Laplace operator and 1/s an integrating process.

From the block diagram of the controlled object shown in FIG. 40, the following equations (42), (43) are obtained:

$$s^2 Vfb = \frac{K}{J2}xa \quad (42)$$

$$s^2 xa = s\frac{\tau_r}{J1} - \left(\frac{1}{J1} + \frac{1}{J2}\right)Kxa \quad (43)$$

where Vfb represents a machine load speed, xa a torsional angular velocity, and s2 a differential of second order.

a, b are expressed by the following equations (44):

$$a = \frac{K}{J2}, \quad b = \left(\frac{1}{J1} + \frac{1}{J2}\right)K \quad (44)$$

Using a, b, the equations (42), (43) are rewritten into the following equations (45), (46):

$$s^2 xb = axa \quad (45)$$

$$s^2 xa = s\frac{\tau_r}{J1} - bxa \quad (46)$$

By substituting the equation (41) in the equation (46), the following equation (47) is obtained:

$$s^2 xa = s[1/sK1 + \alpha K2)Vref - (1/sK1 + K2)Vfb - (1/sK3 + K4)xa] - bxa \quad (47)$$

The equation (48) is obtained from the equation (45):

$$xa = s^2 1/aVfb \quad (48)$$

By substituting the equation (48) in the equation (47) and expanding the resultant equation, the following equation (49) is obtained:

$$s^4 \frac{1}{a} Vfb = \quad (49)$$

$$(K1 + \alpha K2s)Vref - \left(\frac{K1}{a} + s\frac{K2}{a} + s^2\frac{K3}{a} + s^3\frac{K4}{a}\right)Vfb - s^2\frac{b}{a}Vfb$$

The equation (49) is transposed and organized with respect to Vref, Vfb into the equation (50).

$$(K1 + \alpha K2s)Vref = (1/as^4 + 1/aK4s^3 + 1/a(b+K3)s^2 + K2s + K1)Vfb \quad (50)$$

A transfer function from speed command Vref to machine load speed Vfb is determined from the equation (50) as indicated by the following equation (51):

$$\frac{Vm}{Vref} = \frac{a(\alpha K2s + K1)}{s^4 + K4s^3 + (b+K3)s^2 + aK2s + aK1} \quad (51)$$

Characteristic equation F(s) of this system is expressed by the equation (52):

$$F(s) = s^4 + K4s^3 + (b+K3)s^2 + aK2s + aK1 \quad (52)$$

Since F(S) is a quartic equation, the characteristic equation (53) with a quadruple root s=−ω, and ω>0 is considered in order to satisfy stable conditions, where ω represents a target response frequency and ξ1, ξ2 damping constants.

$$G(s)=(s^2+2\zeta_1\omega s+\omega^2)(s^2+2\zeta_2\omega s+\omega^2) \quad (53)$$

If ξ1=ξ2=ξ, then the following characteristic equation (54) is derived:

$$G(s)=s^4+4\zeta\omega s^3+(4\zeta^2+2)\omega^2 s^2+4\zeta\omega^3 s+\omega^4 \quad (54)$$

By comparing the coefficients of the terms (s0 term, s1 term, s2 term, s3 term) of the equations (52), (54), the coefficients are determined as indicated by the following equations (55):

$$\text{From } s0 \text{ term, } K1 = \frac{\omega^4}{a} \quad (55)$$

$$\text{From } s1 \text{ term, } K2 = \frac{4\zeta\omega^3}{a}$$

$$\text{From } s2 \text{ term, } K3 = (4\zeta^2+2)\omega^2 - b$$

$$\text{From } s3 \text{ term } K4 = 4\omega\zeta$$

From the equation (40), the gains of speed controller 51 and vibration suppressor 53 are represented by the equation (56):

$$Kv = \frac{4\omega^3 J2\zeta}{K} \quad (56)$$

$$\frac{1}{Ti} = \frac{\omega}{4\zeta}$$

$$Ksd = 4\omega\zeta$$

$$Ks = \frac{(4\zeta^2+2)\omega^2 - K\left(\frac{1}{J1}+\frac{1}{J2}\right)}{4\omega\zeta}$$

where ξ represents the damping coefficient (ξ>0),
- w represents the target response frequency for speed control,
- J1 represents the moment of inertia of the motor in the 2-inertia system,
- J2 represents the moment of inertia of the machine load, and
- K represents the torsional rigidity value.

A position control process will be described below. Subtractor 72 in position controller 56 subtracts machine load position Pfb from position command Pref to determine a positional deviation. Multiplier 73 multiplies the positional deviation by position loop gain Kp, and outputs the product as a speed command to speed controller 51.

The results of a simulation of the speed control system and the position control system which are tuned by the present invention are shown below.

The parameters of the machine load and the electric motor were set on the basis of anti-resonance frequency WL of 50 [Hz] and resonance frequency WH of 70 [Hz] as follows: electric motor moment of inertia J1 of 0.5102 [Kgm2], machine load moment of inertia J2 of 0.4898 [Kgm2], machine load torsional rigidity value K of 4.8341e+4 [Kgm2/s2].

Target response frequency ω was set to 60 [Hz], and time constant Ti, speed loop gain Kv, torsional angle gain Ks, and torsional angular velocity gain Ksd were tuned based on the equation (54). Position loop gain Kp of position controller 56 was set to Kp=2πω/8[rad/s]. The tuned gains with ξ=1 were Kv=2171.5 [rad/s], Ksd =−1580, Ks=−434.6, and Ti=10.6 [ms].

Figure 41:
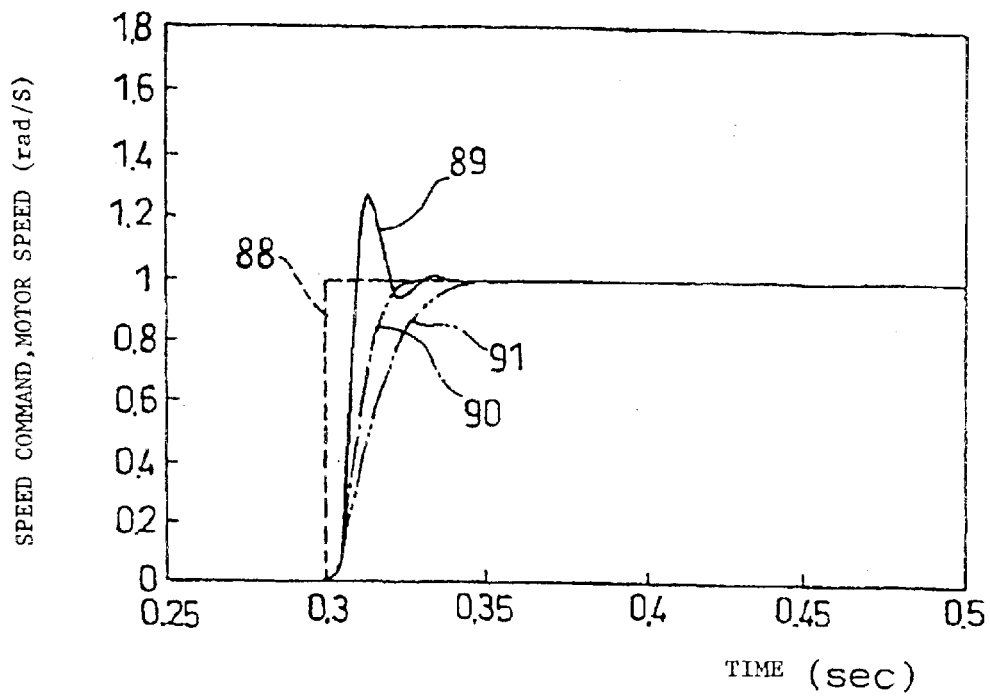
FIG. 41 is a diagram showing a response waveform of a speed control system (I-P controller) of the electric motor control device shown in FIG. 39 when a vibration suppressor is in operation.
Figure 42:
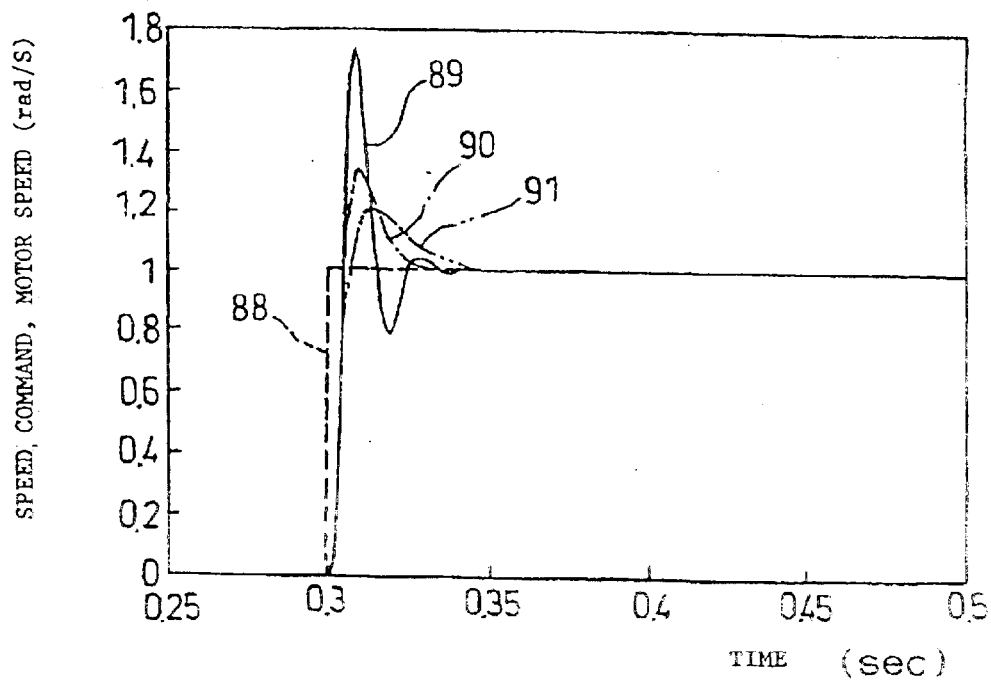
FIG. 42 is a diagram showing a response waveform of a speed control system (PI controller) of the electric motor control device shown in FIG. 39 when the vibration suppressor is in operation.
Figure 43:
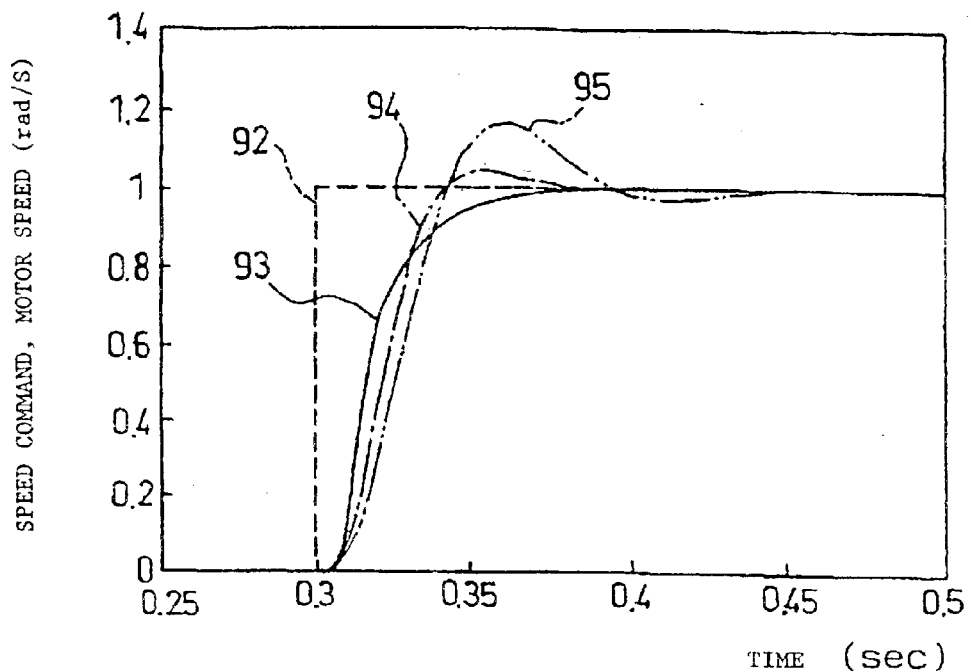
FIG. 43 is a diagram showing a response waveform of a position control system (I-P controller) of the electric motor control device shown in FIG. 39 when the vibration suppressor is in operation.
Figure 44:
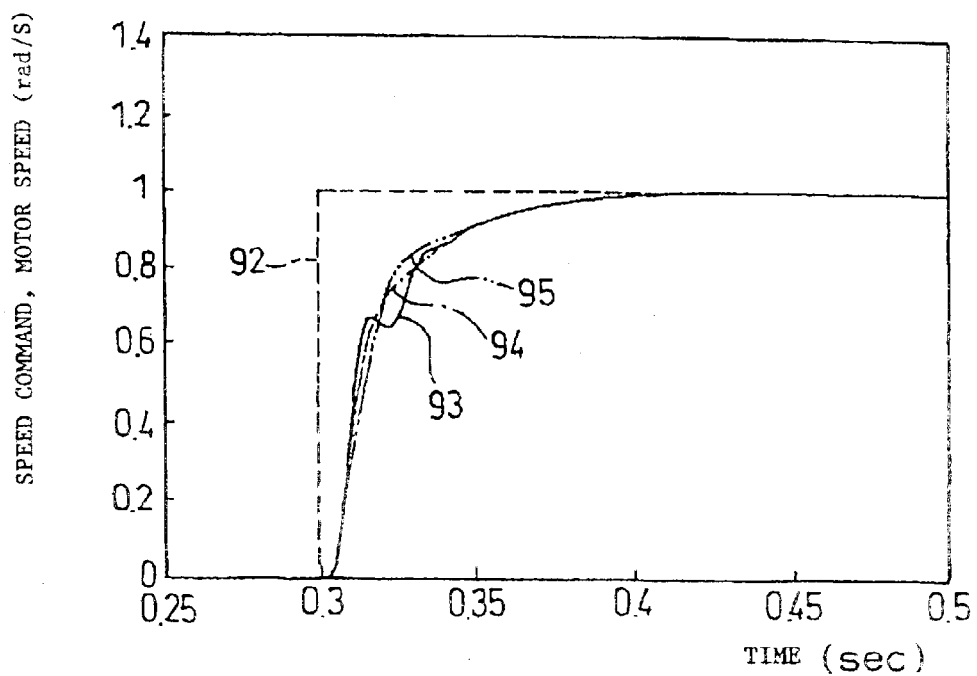
FIG. 44 is a diagram showing a response waveform of a position control system (PI controller) of the electric motor control device shown in FIG. 39 when the vibration suppressor is in operation.

FIGS. 41, 42 show step responses obtained at the time the speed control process is carried out with ξ=0.5, 1, 1.5. FIGS. 43, 44 show step responses obtained at the time the position control process is carried out with ξ=0.5, 1, 1.5. In FIGS. 41, 43, the speed controller performed the I-P control process (α=0). In FIGS. 42, 44, the speed controller performed the PI control process (α=1). Vibrations of the 2-inertia system were suppressed in all cases. In the speed control process, response curve 50 for ξ=1 has the shortest settling time based on both the I-P control process and the PI control process. In the position control process, response curve 53 for=0.5 has the shortest settling time based on the I-P control process, and response curve 55 for ξ=1.5 has the shortest settling time based on the PI control process. It can be seen from the above results that the vibrations can be suppressed by the 2-inertia system, and the parameters (speed loop integral time constant Ti, speed loop gain Kv) of the speed controller and the parameters (torsional angle gain Ks, torsional angular velocity gain Ksd) of the vibration suppressor can automatically be set, with the speed control system and the position control system being applicable to the PI control process and the I-P control process. The settling time can be shortened by changing ξ in association with parameter α.

According to the present embodiment, if a target response is to be changed, then by changing target response frequency ω, the speed controller and the position controller can be adjusted while automatically suppressing vibrations. Therefore, the vibration suppressor, the speed controller, and the position controller do not need to be adjusted on a trial-and-error basis. Furthermore, when the arrangement of the speed controller is changed from the I-P control process to the PI control process using parameter α, the settling time can be shortened by changing ξ in association with parameter α.

What is claimed is:

1. An electric motor control device for controlling an electric motor to actuate, through a transmitting mechanism, a movable member of a machine which has the movable member and an immovable member supporting the movable member, said device comprising:
   - a servo device responsive to a motion command signal for sending a motion signal corresponding to the motion command signal to said electric motor to control the electric motor;
   - a rotation detector for detecting a rotational speed of said electric motor operated by said motion signal:
   - a command generator for generating said motion command signal which does not produce an aliasing error upon a frequency analysis and which does not contain unwanted high-frequency components outside of a measured frequency range; and
   - an analyzing device for outputting the generated motion command signal to said servo device, analyzing frequency characteristics of the machine based on the frequency of said motion command signal and the frequency of a rotation detector signal from said rotation detector, and outputting an analytical result for operating said servo device.

2. An electric motor control device according to claim 1, further comprising a display device for displaying the analytical result from said analyzing device and/or set data of said servo device.

3. An electric motor control device according to claim 2, further comprising a memory device for storing at least one of the analytical result from said analyzing device, the set data of said servo device, and displayed data of said display device.

4. An electric motor control device according to claim 1, further comprising an input device for inputting an analysis command for said analyzing device and/or a servo operation command for said servo device.

5. An electric motor control device for controlling an electric motor to actuate, through a transmitting mechanism, a movable member of a machine which has the movable member and an immovable member supporting the movable member, said device comprising:
- a servo device responsive to a motion command signal for sending a motion signal corresponding to the motion command signal to said electric motor to control the electric motor;
- a rotation detector for detecting a rotational speed of said electric motor operated by said motion signal;
- a command generator for generating motion command signals for causing the electric motor to rotate in a normal direction and a reverse direction; and
- an analyzing device for outputting the motion command signals to said servo device, analyzing frequency characteristics of the machine based on the frequency of said motion command signals and the frequency of a detected rotation signal from said rotation detector, and averaging analytical results from the operation of the electric motor both in the normal direction and in the reverse direction for operating said servo device.

6. An electric motor control device according to claim 5, further comprising a display device for displaying the analytical result from said analyzing device and/or set data of said servo device.

7. An electric motor control device according to claim 6, further comprising a memory device for storing at least one of the analytical result from said analyzing device, the set data of said servo device, and displayed data of said display device.

8. An electric motor control device according to claim 5, further comprising an input device for inputting an analysis command for said analyzing device and/or a servo operation command for said servo device.

9. An electric motor control device for controlling an electric motor to actuate, through a transmitting mechanism, a movable member of a machine which has the movable member and an immovable member supporting the movable member, said device comprising:
- a servo device responsive to a motion command signal for sending a motion signal corresponding to the motion command signal to said electric motor to control the electric motor;
- a rotation detector for detecting a rotational speed of said electric motor operated by said motion signal;
- a command generator for generating said motion command signal having low-frequency components of smaller amplitudes and high-frequency components of larger amplitudes; and
- an analyzing device for outputting said motion command signal to said servo device and analyzing frequency characteristics of the machine based on the frequency of said motion command signal and a detected rotation signal from said rotation detector to provide an analytical result for operating said servo device.

10. An electric motor control device according to claim 9, further comprising a display device for displaying the analytical result from said analyzing device and/or set data of said servo device.

11. An electric motor control device according to claim 10, further comprising a memory device for storing at least one of the analytical result from said analyzing device, the set data of said servo device, and displayed data of said display device.

12. An electric motor control device according to claim 9, further comprising an input device for inputting an analysis command for said analyzing device and/or a servo operation command for said servo device.

13. An electric motor control device having a speed controller for being supplied with a speed command and determining a torque command in order to bring an electric motor speed into conformity with said speed command, a current controller for being supplied with said torque command and energizing an electric motor, and detectors for detecting an electric motor current, an electric motor speed, and a machine load speed, characterized by:
- a parameter $\alpha$ ($0 \leq \alpha \leq 1$) to continuously switch between an integral plus proportional control process and a proportional plus integral control process in a semi-closed speed control process;
- a vibration suppressor for calculating a torsional angular speed from the electric motor speed and the machine load speed and suppressing vibrations using the torsional angular speed; and
- a parameter adjustor for simultaneously adjusting parameters of said speed controller and parameters of said vibration suppressor with the parameter $\alpha$ continuously switching between the integral plus proportional control process and the proportional plus integral control process.

14. An electric motor control device according to claim 13, further comprising means for estimating said machine load speed with an observer if said machine load speed cannot be measured.

15. An electric motor control device according to claim 13, wherein said vibration suppressor comprises means for integrating said torsional angular velocity to calculate a torsional angle, means for multiplying said torsional angle by a torsional angle gain Ks, means for adding said torsional angular velocity to the product of said torsional angle and said torsional angle gain Ks, and multiplying the sum by a torsional angular velocity gain Ksd to determine a vibration suppressing signal, and means for adding said vibration suppressing signal to the torque command, and wherein said means for simultaneously adjusting parameters of said speed controller and parameters of said vibration suppressor adjusts a speed loop gain Kv, a speed loop integral time constant Ti, said torsional angle gain Ks, and said torsional angular velocity gain Ksd in said speed controller according to the following equation:

$$Kv = \frac{4\omega^3 J2\zeta}{K}$$

$$\frac{1}{Ti} = \frac{\omega}{4\zeta}$$

$$Ksd = 4\omega\zeta$$

$$Ks = \frac{(4\zeta^2 + 2)\omega^2 - K\left(\frac{1}{J1} + \frac{1}{J2}\right)}{4\omega\zeta}$$

where $\xi$ represents a damping coefficient ($\xi > 0$),
$\omega$ represents a target response frequency for speed control, J1 represents the method of inertia of the electric motor in a 2-inertia system, J2 represents the method of inertia of a machine load, and K represents a torsional rigidity value.

16. An electric motor control device according to claim 15, wherein a settling time is shortened by changing the damping coefficient ξ in association with the parameter α in the speed controller.

17. An electric motor control device according to claim 13, further comprising a position controller for being supplied with a position command and outputting a speed command to said speed controller in order to bring an electric motor position into conformity with said position command, said position controller having a position loop gain Kp which is a function of the target response frequency ω of said speed controller as expressed by:

$$Kp = \omega/\beta$$

where β represents a real number (β>0).

18. An electric motor control device having a speed controller for being supplied with a speed command and determining a torque command in order to bring a machine load speed into conformity with said speed command, a current controller for being supplied with said torque command and energizing an electric motor, and detectors for detecting an electric motor current, an electric motor speed, and the machine load speed, characterized by:

a parameter α (0≦α≦1) to continuously switch between an integral plus proportional control process and a proportional plus integral control process in a fully closed speed control process;

a vibration suppressor for calculating a torsional angular velocity from the electric motor speed and the machine load speed and suppressing vibrations using the torsional angular speed; and a parameter adjustor for simultaneously adjusting parameters of said speed controller and parameters of said vibration suppressor with the parameter α continuously switching between the integral plus proportional control process and the proportional plus integral control process.

19. An electric motor control device according to claim 18, further comprising means for estimating said machine load speed with an observer if said machine load speed cannot be measured.

20. An electric motor control device according to claim 18, wherein said vibration suppressor comprises means for integrating said torsional angular velocity to calculate a torsional angle, means for multiplying said torsional angle by a torsional angle gain Ks, means for adding said torsional angular velocity to the product of said torsional angle and said torsional angle gain Ks, and multiplying the sum by a torsional angular velocity gain Ksd to determine a vibration suppressing signal, and means for adding said vibration suppressing signal to the torque command, and wherein said means for simultaneously adjusting parameters of said speed controller and parameters of said vibration suppressor adjusts a speed loop gain Kv, a speed loop integral time constant Ti, said torsional angle gain Ks, and said torsional angular velocity gain Ksd in said speed controller according to the following equation:

$$Kv = \frac{4\omega^3 J2\zeta}{K}$$

$$\frac{1}{Ti} = \frac{\omega}{4\zeta}$$

$$Ksd = 4\omega\zeta$$

$$Ks = \frac{(4\zeta^2 + 2)\omega^2 - K\left(\frac{1}{J1} + \frac{1}{J2}\right)}{4\omega\zeta}$$

where ξ represents a damping coefficient (ξ>0),

ω represents a target response frequency for speed control,

J1 represents the method of inertia of the electric motor in a 2-inertia system, J2 represents the method of inertia of a machine load, and K represents a torsional rigidity value.

21. An electric motor control device according to claim 20, wherein a settling time is shortened by changing the damping coefficient ξ in association with the parameter α in the speed controller.

22. An electric motor control device according to claim 18, further comprising a position controller for being supplied with a position command and outputting a speed command to said speed controller in order to bring a machine load position into conformity with said position command, said position controller having a position loop gain Kp which is a function of the target response frequency ω of said speed controller as expressed by:

$$Kp = \omega/\beta$$

where β represents a real number (β>0).

23. A method of controlling an electric motor control device for controlling an electric motor to actuate, through a transmitting mechanism, a movable member of a machine which has the movable member and an immovable member supporting the movable member, said device comprising:

a servo device responsive to a motion command signal for sending a motion signal corresponding to the motion command signal to said electric motor to control the electric motor;

a rotation detector for detecting a rotational speed of said electric motor operated by said motion signal;

a command generator for generating said motion command signal which does not produce an aliasing error upon a frequency analysis and which does not contain unwanted high-frequency components outside of a measured frequency range; and an analyzing device for outputting the generated motion command signal to said servo device, analyzing frequency characteristics of the machine based on the frequency of said motion command signal and the frequency of a rotation detector signal from said rotation detector, and outputting an analytical result for operating said servo device, said method comprising the steps of:

generating said motion command signal, outputting said motion command signal to said servo device, and calculating frequency characteristics from said motion command signal and a detected signal from said rotation detector;

determining a resonance frequency and an anti-resonance frequency from said frequency characteristics; and determining a control parameter from said resonance frequency and said anti-resonance frequency, and adjusting said electric motor control device.

24. A method of controlling an electric motor control device for controlling an electric motor to actuate, through a transmitting mechanism, a movable member of a machine which has the movable member and an immovable member supporting the movable member, said device comprising:
- a servo device responsive to a motion command signal for sending a motion signal corresponding to the motion command signal to said electric motor to control the electric motor;
- a rotation detector for detecting a rotational speed of said electric motor operated by said motion signal;
- a command generator for generating motion command signals for causing the electric motor to rotate in a normal direction and a reverse direction; and
- an analyzing device for outputting the motion command signals to said servo device, analyzing frequency characteristics of the machine based on the frequency of said motion command signals and the frequency of a detected rotation signal from said rotation detector, and averaging analytical results from the operation of the electric motor both in the normal direction and in the reverse direction for operating said servo device, said method comprising the steps of:
- generating said motion command signal, outputting said motion command signal to said servo device, and calculating frequency characteristics from said motion command signal and a detected signal from said rotation detector;
- determining a resonance frequency and an anti-resonance frequency from said frequency characteristics; and
- determining a control parameter from said resonance frequency and said anti-resonance frequency, and adjusting said electric motor control device.

25. A method of controlling an electric motor control device for controlling an electric motor to actuate, through a transmitting mechanism, a movable member of a machine which has the movable member and an immovable member supporting the movable member, said device comprising:
- a rotation detector for detecting a rotational speed of said electric motor;
- a servo device responsive to a motion command signal for sending a motion signal corresponding to the motion command signal to said electric motor to control the electric motor;
- a command generator for generating said motion command signal having low-frequency components of smaller amplitudes and high-frequency components of larger amplitudes; and
- an analyzing device for outputting said motion command signal to said servo device and analyzing the frequency of said motion command signal and a detected rotation signal from said rotation detector to provide an analytical result for operating said servo device, said method comprising the steps of:
- generating said motion command signal, outputting said motion command signal to said servo device, and calculating frequency characteristics from said motion command signal and a detected signal from said rotation detector;
- determining a resonance frequency and an anti-resonance frequency from said frequency characteristics; and
- determining a control parameter from said resonance frequency and said anti-resonance frequency, and adjusting said electric motor control device.

26. A method of controlling an electric motor control device having a speed controller for being supplied with a speed command and determining a torque command in order to bring an electric motor speed into conformity with said speed command, a current controller for being supplied with said torque command and energizing an electric motor, and detectors for detecting an electric motor current, an electric motor speed, and a machine load speed, characterized by:
- a parameter $\alpha$ ($0 \leq \alpha \leq 1$) to continuously switch between an integral plus proportional control process and a proportional plus integral control process in a semi-closed speed control process;
- a vibration suppressor for calculating a torsional angular speed from the electric motor speed and the machine load speed and suppressing vibrations using the torsional angular speed; and
- a parameter adjustor for simultaneously adjusting parameters of said speed controller and parameters of said vibration suppressor with the parameter $\alpha$ continuously switching between the integral plus proportional control process and the proportional plus integral control process, said method comprising the steps of:
- generating said motion command signal, outputting said motion command signal to said servo device, and calculating frequency characteristics from said motion command signal and a detected signal from said rotation detector;
- determining a resonance frequency and an anti-resonance frequency from said frequency characteristics; and
- determining a control parameter from said resonance frequency and said anti-resonance frequency, and adjusting said electric motor control device.

27. A method of controlling an electric motor control device having a speed controller for being supplied with a speed command and determining a torque command in order to bring a machine load speed into conformity with said speed command, a current controller for being supplied with said torque command and energizing an electric motor, and detectors for detecting an electric motor current, an electric motor speed, and the machine load speed, characterized by:
- a parameter $\alpha$ ($0 \leq \alpha \leq 1$) to continuously switch between an integral plus proportional control process and a proportional plus integral control process in a fully closed speed control process;
- a vibration suppressor for calculating a torsional angular velocity from the electric motor speed and the machine load speed and suppressing vibrations using the torsional angular speed; and
- a parameter adjustor for simultaneously adjusting parameters of said speed controller and parameters of said vibration suppressor with the parameter $\alpha$ continuously switching between the integral plus proportional control process and the proportional plus integral control process, said method comprising the steps of:
- generating said motion command signal, outputting said motion command signal to said servo device, and calculating frequency characteristics from said motion command signal and a detected signal from said rotation detector;
- determining a resonance frequency and an anti-resonance frequency from said frequency characteristics; and
- determining a control parameter from said resonance frequency and said anti-resonance frequency, and adjusting said electric motor control device.

* * * * *

UNITED STATES PATENT AND TRADEMARK OFFICE
CERTIFICATE OF CORRECTION

PATENT NO. : 6,822,415 B1
DATED : November 23, 2004
INVENTOR(S) : Takehiko Komiya et al.

It is certified that error appears in the above-identified patent and that said Letters Patent is hereby corrected as shown below:

Title page,
Item [75], Inventors, last inventor, please delete "Fukouka" and add -- Fukuoka --;
Item [73], Assignee, please delete "Kabushiki Kaish Yaskawa Denki" and add
-- Kabushiki Kaisha Yaskawa Denki --;
Item [22], PCT Filed, please delete "Apr. 20, 2001" and add -- Apr. 19, 2001 --.

Signed and Sealed this

Twelfth Day of April, 2005

JON W. DUDAS
*Director of the United States Patent and Trademark Office*